(12) United States Patent
Kondo et al.

(10) Patent No.: US 7,171,795 B2
(45) Date of Patent: Feb. 6, 2007

(54) TRANSVERSE SEALING MECHANISM FOR BAG-MANUFACTURING AND PACKAGING MACHINE AND BAG-PACKAGING MACHINE EQUIPPED THEREWITH

(75) Inventors: Masashi Kondo, Ritto (JP); Yukio Nakagawa, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 10/428,918

(22) Filed: May 5, 2003

(65) Prior Publication Data

US 2003/0213217 A1 Nov. 20, 2003

(30) Foreign Application Priority Data

May 17, 2002 (JP) .............................. 2002-142892

(51) Int. Cl.
B65B 9/08 (2006.01)
B65B 7/14 (2006.01)

(52) U.S. Cl. .......................... 53/334; 53/329.4; 53/451; 53/550; 53/551

(58) Field of Classification Search .................. 53/451, 53/477, 558, 574, 548, 550, 551, 329.2, 329.4, 53/334

See application file for complete search history.

(56) References Cited

U.S. PATENT DOCUMENTS

| | | | | |
|---|---|---|---|---|
| 3,629,987 A | * | 12/1971 | Klopfenstein et al. | ........ 53/552 |
| 3,992,851 A | * | 11/1976 | James et al. | ............... 53/374.6 |
| 4,332,578 A | * | 6/1982 | van der Meulen | .......... 493/197 |
| 4,663,917 A | * | 5/1987 | Taylor et al. | .................. 53/552 |
| 4,750,313 A | | 6/1988 | Kammler et al. | |
| 4,881,360 A | * | 11/1989 | Konzal et al. | ................. 53/439 |
| 5,031,386 A | * | 7/1991 | Schneider | ..................... 53/551 |
| 5,092,102 A | * | 3/1992 | James et al. | ..................... 53/51 |
| 5,215,514 A | * | 6/1993 | Flyghagen et al. | ......... 493/193 |
| 5,279,098 A | * | 1/1994 | Fukuda | ........................ 53/451 |
| 5,347,795 A | * | 9/1994 | Fukuda | ........................ 53/552 |
| 5,622,033 A | * | 4/1997 | Fukuda | ........................ 53/551 |
| 5,685,131 A | * | 11/1997 | Spatolisano et al. | .......... 53/550 |
| 5,753,067 A | * | 5/1998 | Fukuda et al. | ............... 156/358 |

(Continued)

FOREIGN PATENT DOCUMENTS

EP 0469819 A1 2/1992

(Continued)

*Primary Examiner*—Christopher R. Harmon
(74) *Attorney, Agent, or Firm*—Shinjyu Global IP

(57) ABSTRACT

The bag-manufacturing and packaging machine transverse sealing mechanism is for a bag-manufacturing and packaging machine that makes bags by sealing a tubular packaging material longitudinally and transversely while also filling the bags with items to be packaged. The transverse sealing mechanism functions to thermally seal the packaging material in a transverse direction, which is perpendicular to the direction in which the packaging material is conveyed. The transverse sealing mechanism is equipped with a plurality of sealing jaws and an adjusting part. The plurality of sealing jaws rotate about a rotational axis and execute thermal sealing by making contact with the tubular packaging material. The adjusting part adjusts a relative distance between the sealing jaws. The bag-manufacturing and packaging machine transverse sealing mechanism readily accommodates different bag sizes.

16 Claims, 20 Drawing Sheets

U.S. PATENT DOCUMENTS

| | | | |
|---|---|---|---|
| 5,778,641 A * | 7/1998 | Simionato | 53/551 |
| 5,881,539 A * | 3/1999 | Fukuda et al. | 53/526 |
| 5,921,068 A * | 7/1999 | Fangmeier et al. | 53/551 |
| 6,138,442 A * | 10/2000 | Howard et al. | 53/477 |
| 6,408,599 B1 * | 6/2002 | Nakagawa et al. | 53/451 |
| 2002/0162305 A1 | 11/2002 | Miyamoto et al. | |

FOREIGN PATENT DOCUMENTS

| | | |
|---|---|---|
| EP | 1018470 A1 | 7/2000 |
| EP | 1253085 A1 | 10/2002 |
| JP | 2003-11923 A | 1/2003 |
| WO | WO 0035757 A1 | 6/2000 |

* cited by examiner

TRANSVERSE SEALING MECHANISM FOR BAG-MANUFACTURING AND PACKAGING MACHINE AND BAG-PACKAGING MACHINE EQUIPPED THEREWITH

BACKGROUND OF THE INVENTION

1. Field of the Invention

The present invention relates to a transverse sealing mechanism for a bag-manufacturing and packaging machine. More particularly, the present invention relates to transverse sealing mechanism for a bag-manufacturing and packaging machine that makes bags by sealing a tubular packaging material longitudinally and transversely while also filling the bags with items to be packaged.

2. Background Information

There exist longitudinal bag packaging machines that make bags while filling the bags with a food product or other packaging items.

One example is a bag-manufacturing and packaging machine called a "pillow packaging machine." In this machine, a packaging material, which is a sheet-like film, is formed into a tubular form using a tube called a "former." Then, overlapping longitudinal edges of the tubular packaging material are thermally sealed by a longitudinal sealing mechanism. The tubular packaging material, which will become the bag, is then filled with items to be packaged through the tube. Finally, a transverse sealing mechanism located below the tube thermally seals a portion of the tubular packaging material that straddles the top part of the current bag and the bottom part of the next bag, and severs the thermally and transversely sealed portion across its middle with a cutter. In other words, this kind of pillow packaging machine executes two operations as just described: the making of bags and the filling of the bags with items to be packaged.

The transverse sealing mechanism used in this kind of bag-manufacturing and packaging machine often includes a mechanism in which a pair of sealing parts called "sealing jaws," which are arranged so as to face each other across the conveyance path of the tubular packaging material, are pressed together so as to thermally weld the tubular packaging material. When the sealing jaws are arranged such that they undergo mere horizontal linear reciprocal motion, the packaging material can only be sealed at one position. As a result, since the conveyance of the tubular packaging material must be stopped for the period of time required to make the seal, the sealing jaws are often moved along a D-shaped annular path. By making the sealing jaws follow the tubular packaging material as it is conveyed in this way, this kind of bag-manufacturing and packaging machine can secure longer thermal sealing times without stopping the conveyance of the tubular packaging material.

In order to increase the bag packaging speed and increase the number of bags that can be produced per unit time, there are structures adopted recently, in which the transverse sealing mechanism has left and right units that are arranged opposite each other so as to sandwich the conveyance path of the tubular packaging material. In this new structure, each unit is provided with a plurality of sealing jaws that are revolved through an annular path. For example, Japanese Patent Application Publication No. 2001-382895 describes a transverse sealing mechanism having a left sealing jaw revolving unit and a right sealing jaw revolving unit, each provided with two sealing jaws. In other words, there are two pairs of left-right sealing jaws, both of which execute transverse sealing of the tubular packaging material. As a result, the bag packaging capacity is double that of a conventional bag-manufacturing and packaging machine that has one pair of sealing jaws per unit (left and right), when operating at the same revolution velocity.

Bag packaging machines like that described in the aforementioned publication are often used to manufacture bags of the same size continuously. However, there are times when bags of differing sizes must be manufactured. In order to accommodate production of larger bags, it is necessary to increase the spacing between the left and right units of the transverse sealing mechanism. As a result, the overall size of the bag-manufacturing and packaging machine also increases.

In view of the above, there exists a need for bag-manufacturing and packaging machine transverse sealing mechanism which overcomes the above mentioned problems in the prior art. This invention addresses this need in the prior art as well as other needs, which will become apparent to those skilled in the art from this disclosure.

SUMMARY OF THE INVENTION

The purpose of the present invention is to provide a bag-manufacturing and packaging machine transverse sealing mechanism that readily accommodates different bag sizes and a bag-manufacturing and packaging machine that is equipped said transverse sealing mechanism.

The bag-manufacturing and packaging machine transverse sealing mechanism in accordance with the first aspect of the invention is for a bag-manufacturing and packaging machine that makes bags by sealing a tubular packaging material longitudinally and transversely while also filling the bags with items to be packaged. The transverse sealing mechanism functions to thermally seal the packaging material in a transverse direction, which is perpendicular to a direction in which the packaging material is conveyed. The transverse sealing mechanism is equipped with a plurality of sealing parts and an adjusting part. The plurality of sealing parts rotate about a rotational axis and execute thermal sealing by making contact with the tubular packaging material. The adjusting part adjusts a relative distances between the sealing parts.

The transverse sealing mechanism thermally seals the tubular packaging material along the transverse direction thereof while items to be packaged are positioned inside the tubular packaging material. Thus, the tubular packaging material is made into a bag and the bag is filled with items to be packaged. As a result, a bag filled with items is manufactured.

The plurality of sealing parts of the transverse sealing mechanism, which rotate about a rotational axis, are configured such that the relative distances between them change when the adjusting part makes an adjustment. Thus, unlike conventional arrangements in which the relative positions of the sealing parts are fixed and not adjustable, the relative positions of the sealing parts in this transverse sealing mechanism can be adjusted.

Consequently, there are fewer cases in which the movement of one sealing part limits the movement of the other sealing parts during thermal sealing of the tubular packaging material. For example, in order to prevent the sealing parts from disturbing the conveyance of the tubular packaging material, the sealing parts need to be kept in a waiting position and separated from the tubular packaging material as much as possible during the period from when the thermal sealing operation of the first sealing part ends until when the thermal sealing operation of the second sealing part begins.

With conventional transverse sealing mechanisms, the sealing parts are positioned at equal intervals and the flexibility to accommodate different situations is lacking. Conversely, with present transverse sealing mechanism, the adjusting part controls the separate drive means that moves each sealing part on an individual basis. Thus the transverse width dimension of the tubular packaging material can be accommodated flexibly and the movement of the sealing parts can be controlled such that the sealing parts do not disturb the conveyance of the tubular packaging material even when the transverse width of the tubular packaging material is large. This flexibility enables the overall size of the bag-manufacturing and packaging machine to be comparatively smaller.

The bag-manufacturing and packaging machine transverse sealing mechanism in accordance with the second aspect of the present invention is a bag-manufacturing and packaging machine that makes bags by sealing a tubular packaging material longitudinally and transversely while also filling the bags with matter to be packaged. The transverse sealing mechanism functions to thermally seal the packaging material in a transverse direction, which is perpendicular to a direction in which the packaging material is conveyed. This transverse sealing mechanism is provided with a first sealing part moving unit, a second sealing part moving unit, and an adjusting part. The first sealing part moving unit is arranged on one side of the tubular packaging material and the second sealing part moving unit is arranged on the other side of the tubular packaging material. The first and second sealing part moving units each can have a plurality of sealing parts. The sealing parts of the first sealing part moving unit and the sealing parts of the second sealing part moving unit move so as to pinch the tubular packaging material and thermally seal the tubular packaging material. The adjusting part can adjust the relative distance between the sealing parts of the first sealing part moving unit and the relative distance between the sealing parts of the second sealing part moving unit.

The transverse sealing mechanism thermally seals the tubular packaging material along the transverse direction thereof while the items to be packaged are positioned inside the tubular packaging material. Thus, the tubular packaging material is made into a bag and the bag is filled with the items to be packaged. As a result, a bag filled with the items is manufactured.

The respective sealing parts of the first and second sealing part moving units are configured such that their relative distance changes when adjusted by the adjusting part. Thus, unlike conventional arrangements in which the relative positions of the sealing parts are fixed and not adjustable, in this transverse sealing mechanism the relative positions of the sealing parts can be adjusted.

Consequently, there are fewer cases in which the movement of one sealing part during thermal sealing of the tubular packaging material limits the movement of the other sealing parts. For example, in order to avoid disturbing the conveyance of the tubular packaging material, the sealing parts need to be kept in a waiting position and separated from the tubular packaging material as much as possible during the period from when the thermal sealing operation of the first sealing part ends until when the thermal sealing operation of the second sealing part begins. With conventional transverse sealing mechanisms, the sealing parts are positioned at equal intervals and the flexibility to accommodate different situations is lacking. Conversely, with present transverse sealing mechanism, the adjusting part controls the separate drive means that move each sealing part on an individual basis. Thus, the transverse dimension of the tubular packaging material can be accommodated flexibly and the movement of the sealing parts can be controlled such that the sealing parts do not disturb the conveyance of the tubular packaging material even when the transverse width of the tubular packaging material is large. This flexibility enables the overall size of the bag-manufacturing and packaging machine to be comparatively smaller.

The bag-manufacturing and packaging machine transverse sealing mechanism in accordance with the third aspect of the present invention is a traverse sealing mechanism of the first or second aspect, wherein the adjusting part adjusts the relative distance between the sealing parts according to the size of the bag being made.

Since the adjusting part adjusts the relative positions of the sealing parts according to the size of the bags, bags can be made continuously while mixing in bags of different longitudinal dimensions. Also, when it is necessary to conduct transverse sealing of the tubular packaging material at different spacings, the relative distance between the sealing parts of each sealing part moving unit can be adjusted accommodate those spacings.

The bag-manufacturing and packaging machine transverse sealing mechanism in accordance with the fourth aspect of the present invention is a transverse sealing mechanism of one of the first through third aspects, wherein each of the sealing parts is moved by different drive means and the adjusting part adjusts the relative distances between the sealing parts by controlling each of the different drive means.

Here, drive means is provided for each sealing part. In other words, the drive means that drives the first sealing part is separate from the drive means that drives the second sealing part. Also, the adjusting part changes the relative distance between the sealing parts by controlling each drive means on an individual basis.

The bag-manufacturing and packaging machine transverse sealing mechanism in accordance with the fifth aspect of the present invention is a transverse sealing mechanism of one of the first through third aspects, wherein the sealing parts are moved by drive means and the relative distances between sealing parts is changed by a relative distance changing means. Also, the adjusting part adjusts the relative distances between sealing parts by controlling the relative distance changing means. The relative distance changing means changes the phase difference between the sealing parts in a case where the sealing parts are arranged so as to revolve around a prescribed rotational axis.

The drive means moves the sealing parts and the relative distance changing means changes the relative distances between the sealing parts.

The bag-manufacturing and packaging machine transverse sealing mechanism in accordance with the sixth aspect of the invention is a transverse sealing mechanism of one of the first through fifth aspects, further provided with first revolution parts, second revolution parts, a first revolution shaft, and a second revolution shaft. One end of each sealing part is supported by a first revolution part and the other end is supported by a second revolution part. Each first revolution part is coupled to the first revolution shaft and revolves when the first revolution shaft rotates. Each second revolution part is turnably supported by the second revolution shaft. The first and second revolution shafts are separated from each other.

The two ends of each sealing part are supported by a first revolution part that is revolved by a first revolution shaft and a second revolution part that is turnably supported by a second revolution shaft, respectively. Therefore, when the sealing part contacts the tubular packaging material and executes thermal sealing, variation in the degree of sealing between the two ends of the sealing part is suppressed. Additionally, the first revolution shaft at one end of the sealing part and the second revolution shaft at the other end of the sealing part are separated such that no shaft exists along the portion of the revolution axis corresponding to the center portion of the sealing part. Thus, when the sealing part is positioned far away from the tubular packaging material and the sealing part is farther from the tubular packaging material than the revolution axis of the sealing part, disturbance of the conveyance of the tubular packaging material by the revolution shaft of the sealing part can be avoided even if the side edges of the tubular packaging material being conveyed are positioned close to the revolution axis of the sealing part.

The bag-manufacturing and packaging machine transverse sealing mechanism in accordance with the seventh aspect of the invention is a transverse sealing mechanism of one of the first through sixth aspects, further provided with a rubbing part. The rubbing part operates in coordination with the sealing parts so as to contact the tubular packaging material before the sealing parts do and move the items to be packaged downward.

Since the rubbing part moves the items to be packaged downward before the sealing parts make the thermal seal, the items to be packaged are not likely to be pinched in the seal portion of the bag during thermal sealing. Since the rubbing part operates in coordination with the sealing parts, it is not necessary to provide a separate rubbing mechanism, and the size of the bag-manufacturing and packaging machine can be reduced.

The bag-manufacturing and packaging machine transverse sealing mechanism in accordance with the eighth aspect of the present invention is a transverse sealing mechanism of one of the first through seventh aspect, further provided with a shutter part. The shutter part operates in coordination with the sealing parts so as to contact the tubular packaging material before the sealing parts do and restrict the intrusion of the items to be packaged into the thermal seal portion of the tubular packaging material.

Since the intrusion of the items to be packaged into the thermal seal portion of the tubular packaging material is restricted by the shutter part, pinching of the items to be packaged in the thermal seal portion of the bag is suppressed. Also, since the shutter part operates in coordination with the sealing parts, it is not necessary to provide a separate shutter mechanism and the size of the bag-manufacturing and packaging machine can be reduced.

The bag-manufacturing and packaging machine transverse sealing mechanism in accordance with the ninth aspect of the present invention is a transverse sealing mechanism of one of the first through sixth aspects, further provided with rubbing parts whose distance relative to the sealing parts can be changed and which contact the tubular packaging material before the sealing parts do and move the items to be packaged downward. Additionally, the adjusting part adjusts the relative distances between the sealing parts and the rubbing parts.

Here, the adjusting part not only adjusts the relative distances between sealing parts but also the relative distances between sealing parts and the rubbing parts. Thus, the movement of one sealing part is less likely to limit the movement of the other sealing parts or the rubbing parts during thermal sealing of the tubular packaging material. For example, in order to prevent the sealing parts and rubbing parts from disturbing the conveyance of the tubular packaging material, the sealing parts and rubbing parts need to be kept in a waiting position and separated from the tubular packaging material as much as possible during the period from when the thermal sealing operation of the first sealing part ends until when the thermal sealing operation of the second sealing part begins. With conventional transverse sealing mechanisms, the sealing parts are positioned at equal intervals and the rubbing parts are dependent on the sealing parts. Consequently, the flexibility to accommodate different situations is lacking. Conversely, with present transverse sealing mechanism, the relative distance between the sealing parts and the relative distance between the sealing parts and rubbing parts can be adjusted by the adjusting part. Thus, the transverse dimension of the tubular packaging material can be accommodated flexibly and the sealing parts and rubbing parts can be prevented from disturbing the conveyance of the tubular packaging material even when the transverse width of the tubular packaging material is large.

Furthermore, by using the adjusting part to adjust the relative positions of the rubbing parts with respect to the sealing parts before the thermal sealing operation and during the thermal sealing operation, the downward movement of the items to be packaged by the rubbing parts can be optimized.

The bag-manufacturing and packaging machine transverse sealing mechanism in accordance with the tenth aspect of the present invention is a transverse sealing mechanism of one of the first through sixth aspects, further provided with shutter parts. The distance relative of the shutter parts with respect to the sealing parts can be changed, and the shutter parts contact the tubular packaging material before the sealing parts do and restrict the intrusion of the items to be packaged into the thermal seal portion of the tubular packaging material. Additionally, the adjusting part adjusts the relative distances between the sealing parts and shutter parts.

Here, the adjusting part not only adjusts the relative distance between sealing parts but also adjusts the relative distance between sealing parts and shutter parts. Thus, the movement of one sealing part is less likely to limit the movement of the other sealing parts or the shutter parts during thermal sealing of the tubular packaging material. For example, in order to prevent the sealing parts and shutter parts from disturbing the conveyance of the tubular packaging material, the sealing parts and shutter parts need to be kept in a waiting position and separated from the tubular packaging material as much as possible during the period from when the thermal sealing operation of the first sealing part ends until when the thermal sealing operation of the second sealing part begins. With conventional transverse sealing mechanisms, the sealing parts are positioned at equal intervals and the shutter parts are dependent on the sealing parts. Consequently, the flexibility to accommodate different situations is lacking. Conversely, with present transverse sealing mechanism, the relative distance between the sealing parts and the relative distance between the sealing parts and shutter parts can be adjusted by the adjusting part. Thus, the transverse dimension of the tubular packaging material can be accommodated flexibly and the sealing parts and shutter parts can be prevented from disturbing the conveyance of the tubular packaging material even when the transverse width of the tubular packaging material is large.

Furthermore, by using the adjusting part to adjust the relative positions of the shutter parts with respect to the sealing parts before the thermal sealing operation and during the thermal sealing operation, the operation of the shutter parts to restrict the intrusion of items to be packaged into the thermal seal portion can be optimized.

The bag-manufacturing and packaging machine in accordance with an eleventh aspect of the present invention makes bags by sealing a tubular packaging material longitudinally and transversely while also filling the bags with items to be packaged. The bag-manufacturing and packaging machine is provided with a packaging material conveying mechanism, a longitudinal sealing mechanism, and a transverse sealing mechanism of one of the first through tenth aspect of the present invention. The packaging material conveying mechanism conveys the tubular packaging material downward. The longitudinal sealing mechanism longitudinally joins an overlapping portion of the conveyed tubular packaging material.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

<Overall Constitution>

Figure 1:
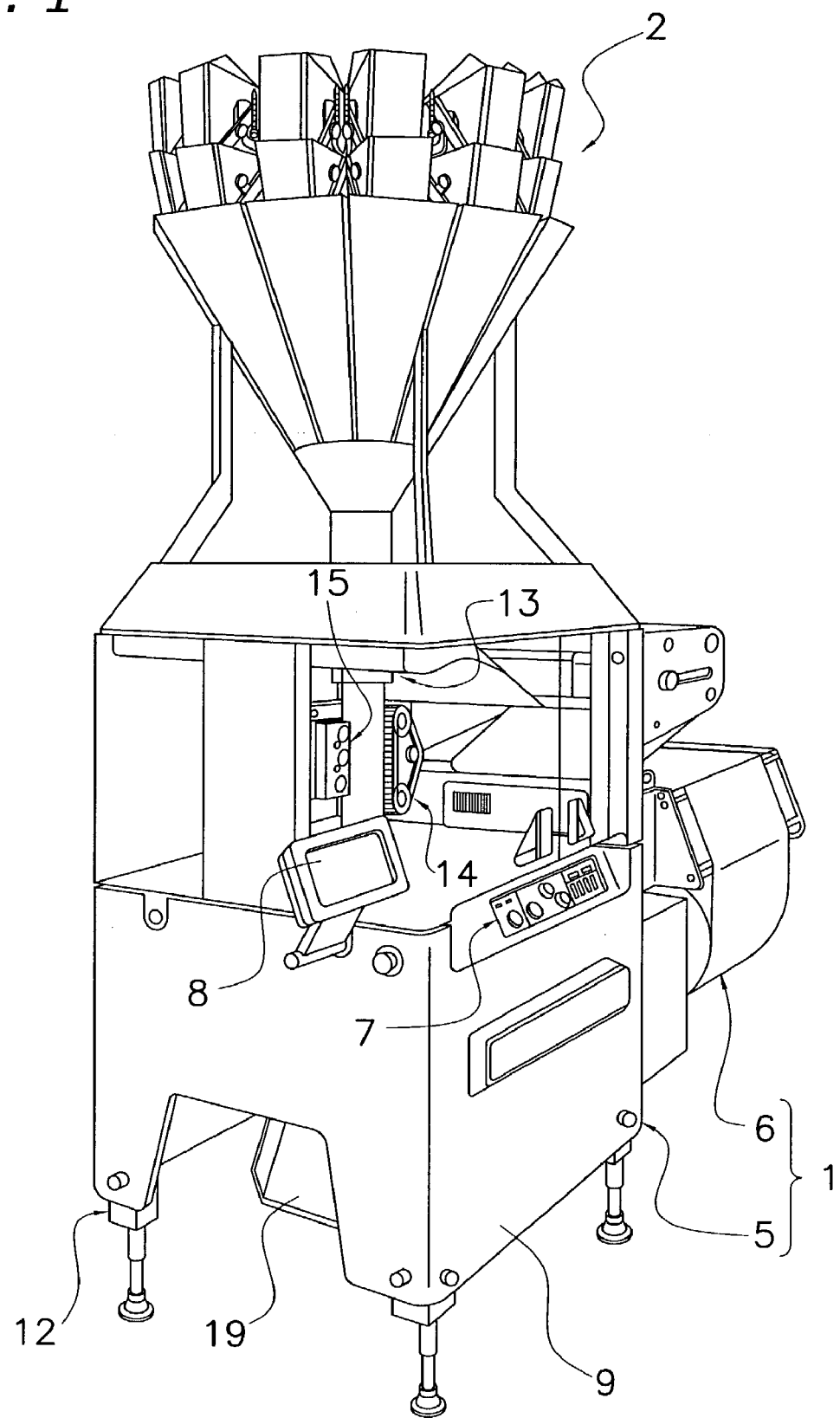
FIG. 1 is a perspective view of a bag-manufacturing and packaging machine in accordance with an embodiment of the present invention.
Figure 2:
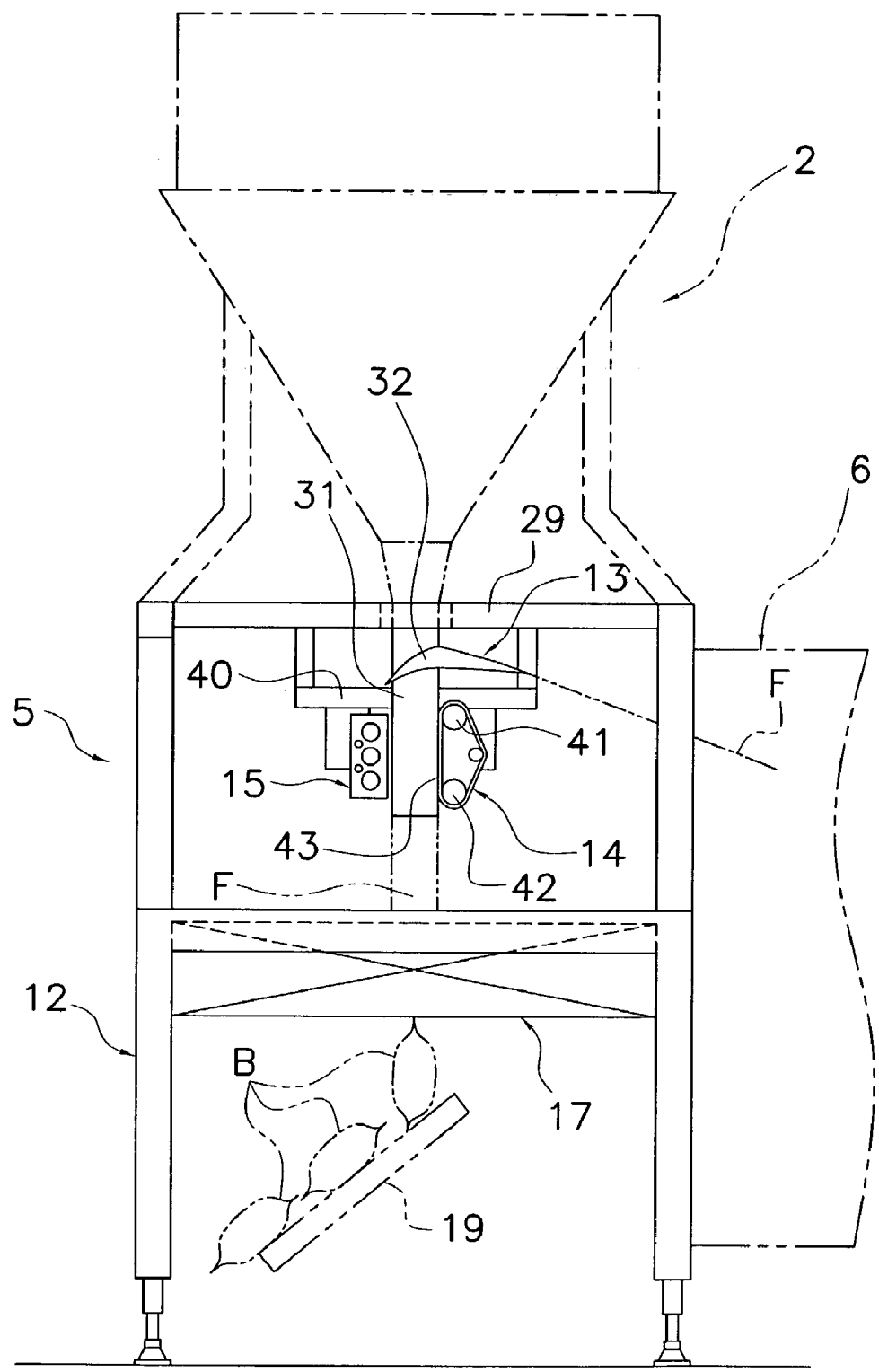
FIG. 2 is a side view of the bag-manufacturing and packaging machine in accordance with the embodiment of the present invention.

A bag-manufacturing and packaging machine equipped with a transverse sealing mechanism in accordance with an embodiment of the present invention and a metering machine that feeds items to be packaged to the bag-manufacturing and packaging machine are shown in FIG. 1 and FIG. 2. The bag-manufacturing and packaging machine shown in these figures is a machine that packages such items as potato chips. The bag-manufacturing and packaging machine chiefly includes a bag-manufacturing and packaging section 5 that serves as a main section where the items to be packaged are put into bags, and a film feeding section 6 that feeds film that becomes bags to the bag-manufacturing and packaging section 5. An operating switch 7 is arranged on the front panel of the bag-manufacturing and packaging section 5. A liquid crystal display 8 that indicates the operational state is arranged in a position such that the liquid crystal display 8 can be viewed by an operator operating the operating switch 7.

<Constituent Features of the Film Feeding Section and the Bag-Manufacturing and Packaging Section>

The film feeding section 6 serves to feed sheet-like film to a forming mechanism 13 of the bag-manufacturing and packaging section 5. In this embodiment, the film feeding section 6 is provided adjacent to the bag-manufacturing and packaging section 5. A roll of film is set in the film feeding section 6 such that the film can be discharged from the roll. Since the film feeding section is a component that is well known in the art, further explanation of its detailed structure will be omitted herein.

As shown in FIGS. 1 and 2, the bag-manufacturing and packaging section 5 includes a forming mechanism 13 that forms the film that is fed in sheet form into a tubular form, a pull-down belt mechanism (an example of packaging material conveying mechanism) 14 that conveys the tubular-formed film (hereinafter called "tubular film") downward, a longitudinal sealing mechanism 15 that longitudinally heat-seals an overlapping section of the tubular film, a transverse sealing mechanism 17 that transversely seals the tubular film so as to close the top and bottom ends of the bag, and a support frame 12 that supports these mechanisms. A casing 9 is installed around the support frame 12. The forming mechanism 13 and the pull-down belt mechanism 14 constitute a packaging material conveying mechanism.

The forming mechanism 13 has a tube 31 and a former 32, as shown in FIG. 2. The tube 31 is a cylindrical member that is open at its upper and lower ends. The tube 31 is arranged below an open portion of a ceiling plate, which is located near the center of the ceiling plate 29. The tube 31 is integrally joined with the former 32 by a bracket not shown in the figures. A combination weighing machine 2 delivers a metered predetermined quantity of items to be packaged into the upper opening of the tube 31. The former 32 is arranged so as to surround the tube 31. The former 32 is shaped such that the sheet-like film F fed from the film feeding section 6 is formed into a tubular form as it passes between the former 32 and the tube 31. The former 32 is fixedly supported to the support frame 12 by a support member not shown in the figures. The tube 31 and former 32 of the forming mechanism 13 are constituted such that they can be exchanged with other tubes and formers having different widths and dimensions, depending on the width dimension of the bags being made. Consequently, the forming mechanism 13 can be freely attached to and detached from the support frame 12. Since the forming mechanism and the combination weighing machine are components that are well-known in the art, further explanation of their detailed structures will be omitted herein.

The pull-down belt mechanism 14 and the longitudinal sealing mechanism 15 are supported by a rail 40 so as to hang down from the ceiling plate 29, and arranged so as to sandwich the tube 31 from both sides. The pull-down belt mechanism 14 and the longitudinal sealing mechanism 15 are moved along the rail 40 and positioned accordingly when the tube 31 is installed. The pull-down belt mechanism 14 is a mechanism that by suction holds the tubular film F that is wrapped onto the tube 31, and conveys the film downward. The pull-down belt mechanism comprises chiefly a drive roller 41, a driven roller 42, and a belt 43 that has a suction-holding function. The longitudinal sealing mechanism 15 longitudinally seals an overlapped portion of the tubular film, which is wrapped onto the tube 31, by applying heat while pressing against the tube 31 with a constant pressure. The longitudinal sealing mechanism 15 has a heated belt or the like that is heated by a heating element and contacts the overlapping portion of the tubular film. Since the pull-down belt mechanism and the longitudinal sealing mechanism are components that are well-known in the art, further explanation of their detailed structures will be omitted herein.

<Constituent Features of the Transverse Sealing Mechanism>

Figure 3:
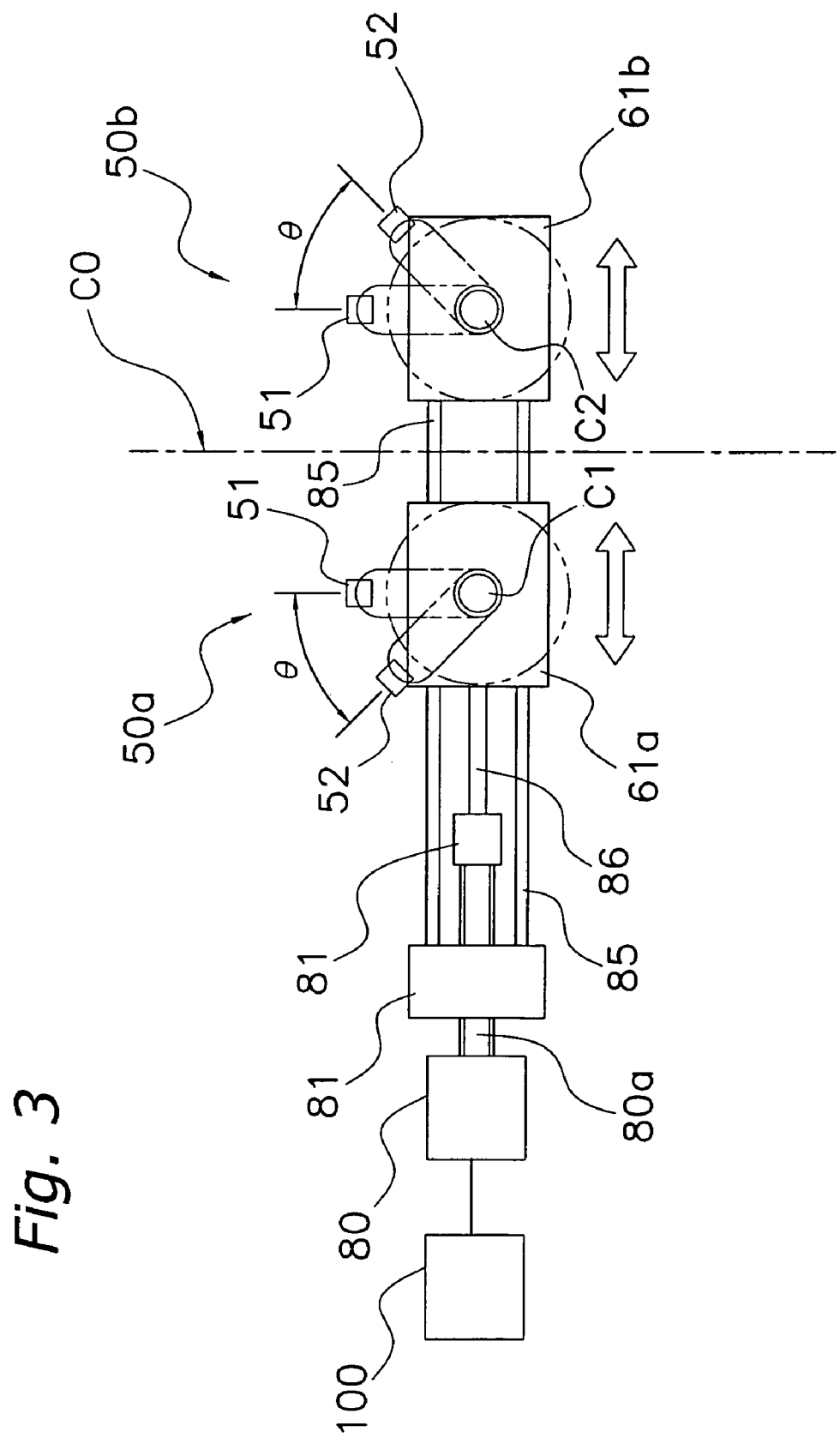
FIG. 3 is a side view of the transverse sealing mechanism of the bag-manufacturing and packaging machine in accordance with the embodiment of the present invention.
Figure 4:
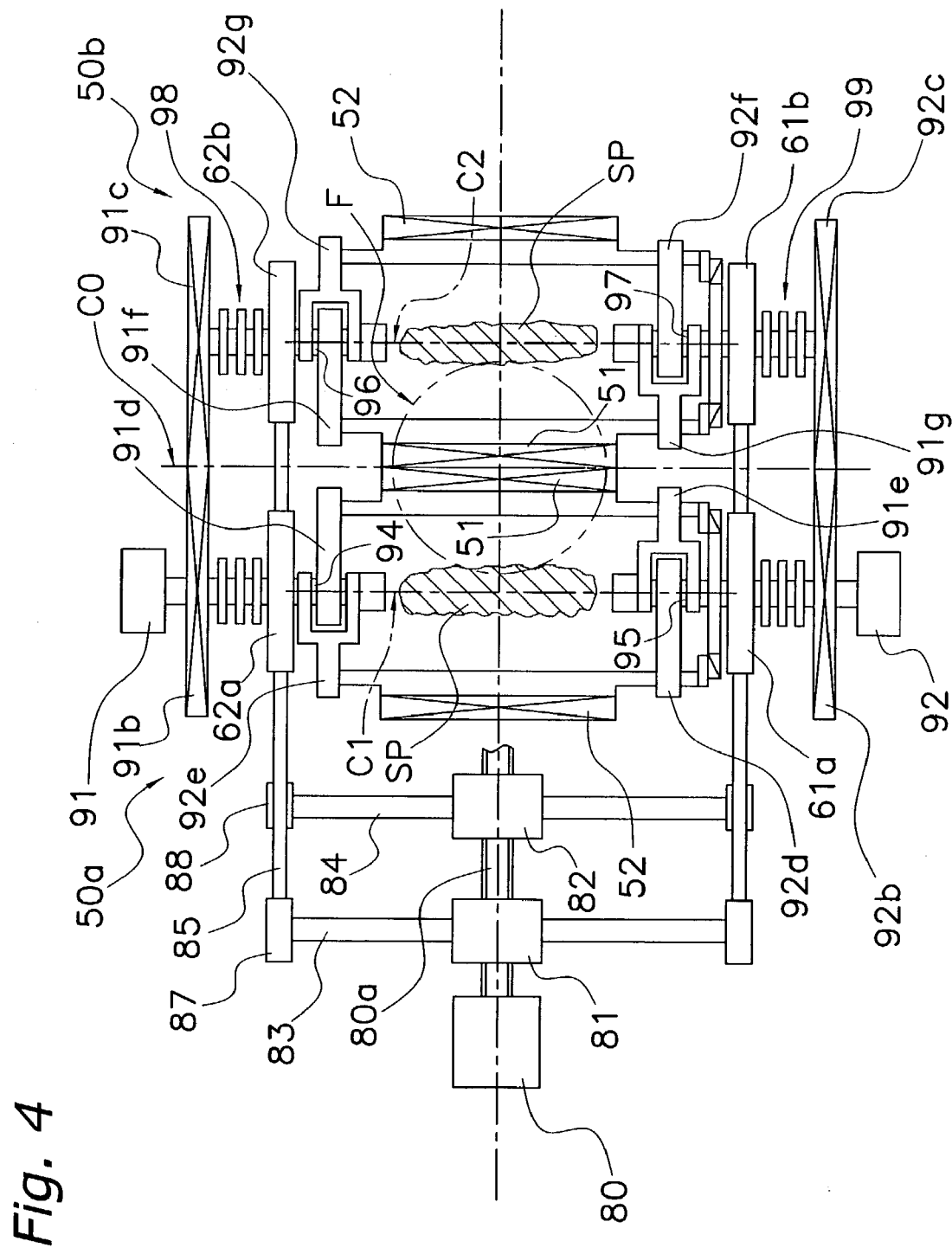
FIG. 4 is a plan view of the transverse sealing mechanism of the bag-manufacturing and packaging machine in accordance with the embodiment of the present invention.
Figure 6:
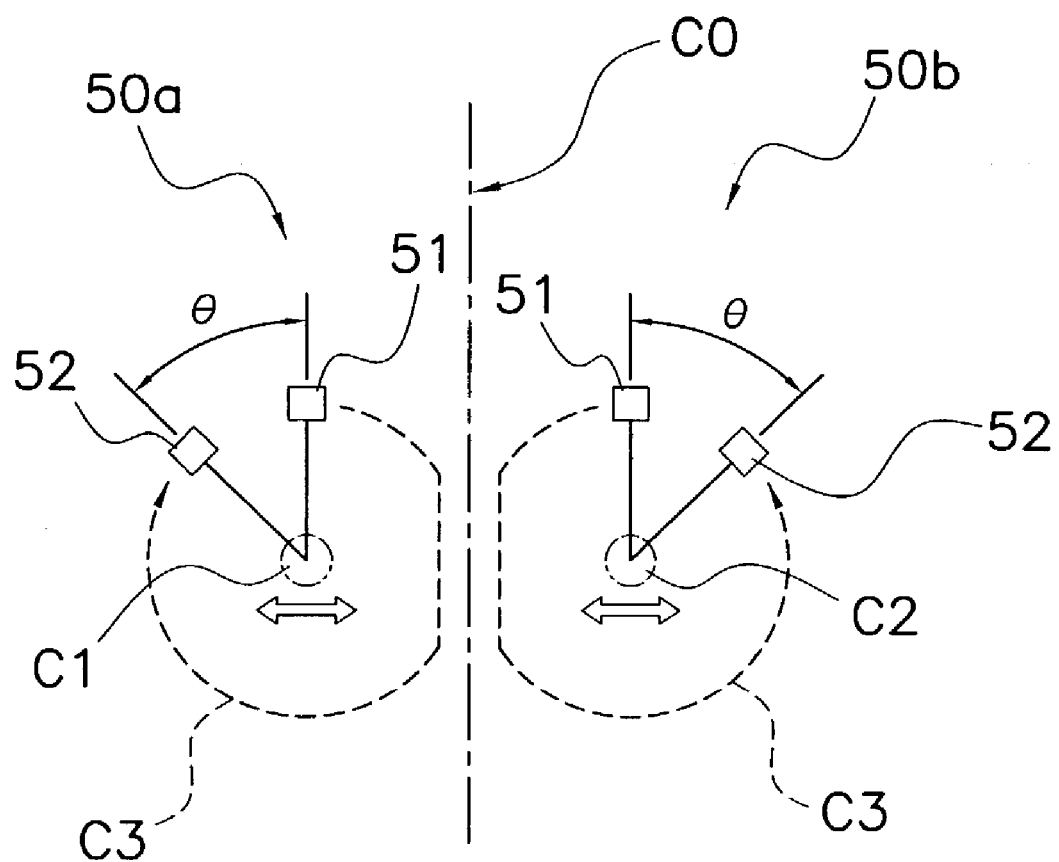
FIG. 6 shows the revolution path of the sealing jaws and the phase difference between the sealing jaws.

The transverse sealing mechanism 17 is arranged below the forming mechanism 13, pull-down mechanism 14, and longitudinal sealing mechanism 15. The transverse sealing mechanism 17 is supported by the support frame 12. As shown in FIGS. 3 and 4, the transverse sealing mechanism 17 includes left and right sealing jaw moving units 50a, 50b. The sealing jaw moving units 50a, 50b each revolve two sealing jaws 51, 52 through a D-shaped path C3 (an example of first and second circulating path), which is indicated by the broken lines in FIG. 6. When transversely sealing the tubular film, the two sealing jaw moving units 50a, 50b press the pair of sealing jaws 51 or the pair of sealing jaws 52 together. In the following explanation, the sealing jaw moving unit positioned on the left of the tubular film F in FIGS. 3 and 4 will be called the first sealing jaw moving unit 50a, while the unit positioned on the right will be called the second sealing jaw moving unit 50b. The tubular film F is conveyed downward along a plane C0 that separates the two sealing jaw moving units 50a, 50b. In the mean time, the two sealing jaw moving units 50a, 50b are positioned such that the plane C0 is at the widthwise center thereof (i.e., of the tubular film F).

The sealing jaw moving units 50a, 50b each have a sealing jaw 51 and a sealing jaw 52. However, the drive motor for the sealing jaws 51 and the drive motor for the sealing jaws 52 are different ones. The sealing jaws 51 are driven by a drive motor 91 so as to rotate about axes C1 and C2. More specifically, the sealing jaw 51 of the first sealing jaw moving unit 50a rotates about axis C1 and the sealing jaw 51 of the second sealing jaw moving unit 50b rotates about axis C2. Meanwhile, the sealing jaws 52 are driven by a drive motor 92 so as to rotate about axes C1 and C2. More specifically, the sealing jaw 52 of the first sealing jaw moving unit 50a rotates about axis C1 and the sealing jaw 52 of the second sealing jaw moving unit 50b rotates about axis C2.

The drive motor 91 rotates gears 91b, 91c and the rotation of the gears is transmitted through a Schmidt coupling 98 to revolution shafts 94, 96, which are coaxial with respect to the axes C1, C2 of the sealing jaw moving units 50a, 50b. One end of a lever 91d is fixed to the revolution shaft 94 and one end of another lever 91f is fixed to the revolution shaft 96; the levers 91d, 91f respectively rotate about the revolution axes C1, C2.

Meanwhile, the drive motor 92 rotates gears 92b, 92c and the rotation of the gears is transmitted through a Schmidt coupling 99 to revolution shafts 95, 97, which are coaxial with respect to the revolution axes C1, C2 of the sealing jaw moving units 50a, 50b. One end of a lever 92d is fixed to the revolution shaft 95 and one end of another lever 92f is fixed to the revolution shaft 97; the levers 92d, 92f respectively rotate about the revolution axes C1, C2.

The D-shaped paths C3 are defined as the trajectories of the sealing jaws 51 and 52, which rotate about the axes C1 and C2 via the levers 91d, 91e, 91f, 91g, 92d, 92e, 92f, and 92g. In other words, the shape of the D-shaped paths C3 are predetermined by the 91d, 91e, 91f, 91g, 92d, 92e, 92f, and 92g, which are rotatively coupled to the shafts 94–97.

The sealing jaw 51 of the first sealing jaw moving unit 50a is supported at one end by the tip end of the lever 91d (an example of first revolutionary part) and at the other end by the tip end of a lever 91e (another example of the first revolutionary part). The lever 91e is a member that rotates about the revolution axis C1 and is supported such that it can rotate relative to the revolution shaft 95.

The sealing jaw 51 of the second sealing jaw moving unit 50b is supported at one end by the tip end of the lever 91f (an example of third revolutionary part) and at the other end by the tip end of a lever 91g (another example of the third revolutionary part). The lever 91g is a member that rotates about the revolution axis C2 and is supported such that it can rotate relative to the revolution shaft 97.

The sealing jaw 52 of the first sealing jaw moving unit 50a is supported at one end by the tip end of the lever 92d (an example of the second revolutionary part) and at the other end by the tip end of a lever 92e (another example of the second revolutionary part). The lever 92e is a member that rotates about the revolution axis Cl and is supported such that it can rotate relative to the revolution shaft 94.

The sealing jaw 52 of the second sealing jaw moving unit 50a is supported at one end by the tip end of the lever 92f (an example of the fourth revolutionary part) and at the other end by the tip end of a lever 92g (another example of the fourth revolutionary part). The lever 92g is a member that rotates about the revolution axis C2 and is supported such that it can rotate relative to the revolution shaft 96.

Thus, the sealing jaws 51, 52 rotate about the revolution shafts 94, 95, 96, 97 with revolution shafts 94 and 95 being separated from each other and revolution shafts 96 and 97 being separated from each other. A space SP exists between each pair of separated shafts (see FIG. 4).

The sealing jaws 51, 52 are longer in the vertical direction of FIG. 4 than the width of the tubular film F. The sealing jaws 51, 52 are provided with internal heating elements. The sealing surfaces of the sealing jaws 51, 52 are heated by the heating elements such that a portion of the tubular film F is thermally sealed when pinched between the left and right sealing jaws 51, 52. The sealing jaws are conventional components that are well known in the art. Since the sealing jaws are well known in the art, further explanation of their structures will be omitted herein.

Each of the Schmidt couplings 98, 99 includes three circular disks joined by links. The Schmidt couplings 98, 99 serve as a shaft coupling that transmits the rotation of the input shaft to the output shaft. These Schmidt couplings 98, 99 are contrived such that they can transmit the rotation of the input shaft to the output shaft even in situations where the output shaft moves in a planar manner with respect to the planarly fixed input shaft such that the distance between the shafts changes.

Figure 5:
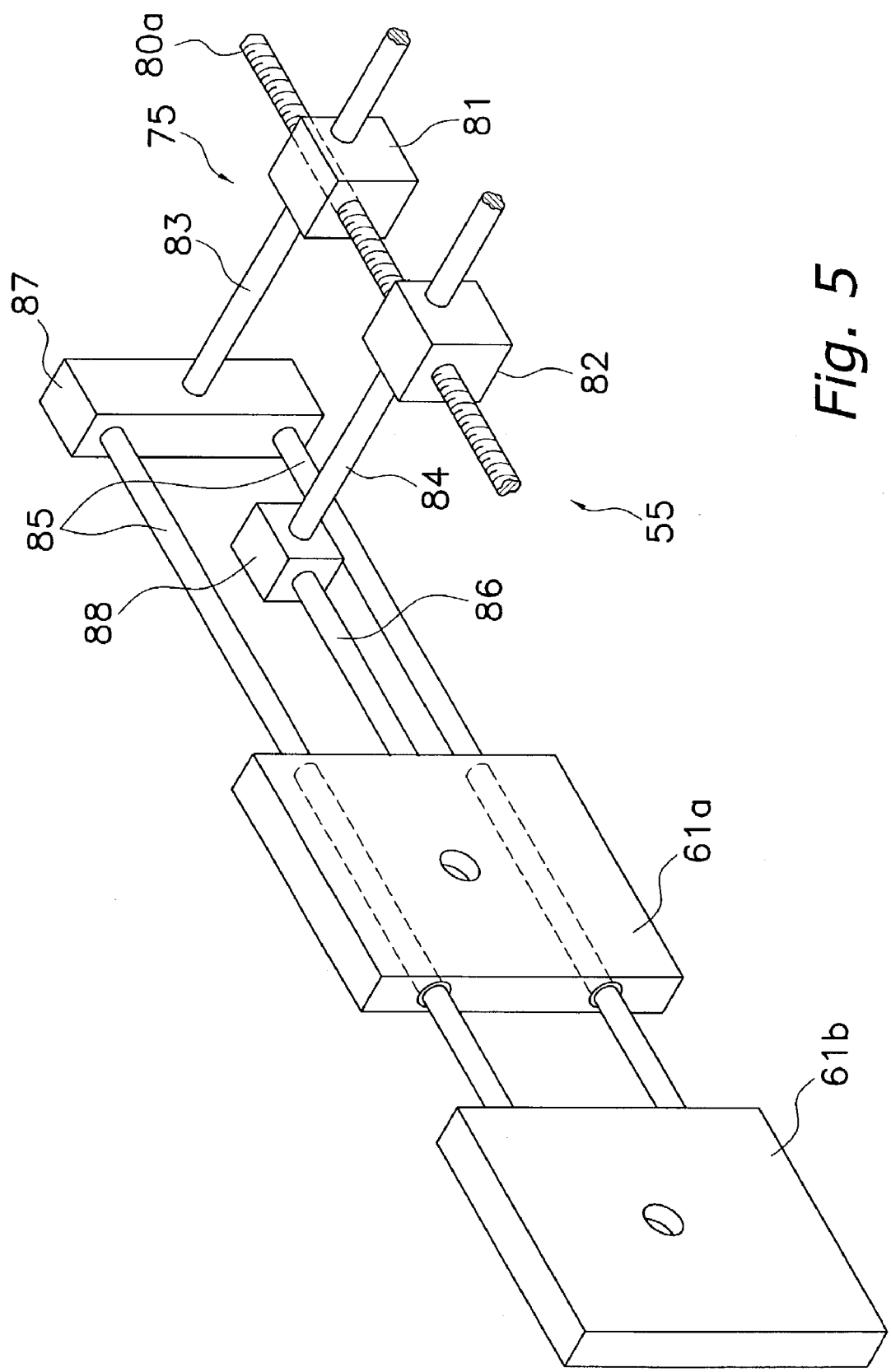
FIG. 5 is a perspective view of the sideways drive mechanism of the bag-manufacturing and packaging machine in accordance with the embodiment of the present invention.

The revolution shafts 94, 95, 96, and 97 are turnably supported by horizontal movement plates 62a, 61a, 62b, and 61b, respectively. The horizontal movement plates 62a, 61a, 62b, 61b are moved horizontally by sideways drive mechanism 55 shown in FIG. 5. The horizontal movement plates 61a and 62a move together in the same manner, while the horizontal movement plates 61b and 62b move together in the same manner. Here, operation the sideways drive mechanism 55 is described with reference to the horizontal movement plates 61a and 61b. As shown in FIG. 5, the sideways drive mechanism 55 has a drive mechanism 75 for moving the horizontal movement plates 61a, 61b closer or apart, and a guide part or guide rail that supports the horizontal movement plates 61a, 61b such that they can slide freely in the horizontal direction.

The drive mechanism 75 includes a ball screw 80a rotated by a servomotor 80 (see FIG. 3), first and second nut members 81, 82 that threadedly engage with the ball screw 80a, first and second linking rods 83, 84 that are arranged horizontally to each other and perpendicular to the ball screw 80a, a pair of third linking rods 85 arranged along the movement direction, and a fourth linking rod 86 arranged parallel to the third linking rods 85.

The first linking rod 83 is linked to the pair of third linking rods 85 through a coupling 87. In the mean time, the tips of the two third linking rods 85 are fixedly attached to a lateral end face of the horizontal movement plate 61b. The two third linking rods 85 pass through the horizontal movement plate 61a such that they can slide freely through the horizontal movement plate 61a. The second linking rod 84 is linked to the fourth linking rod 86 through a coupling 88. In the mean time, the tip of the fourth linking rod 86 is fixedly attached to a lateral end face of the horizontal movement plate 61a.

In the ball screw 80a, the portion of the ball screw 80a that mates with the first nut member 81 and the portion that mates with the second nut member 82 have opposite threads.

Thus, by rotating the ball screw 80a of the drive mechanism 75, the horizontal movement plates 61a, 61b can be made to approach each other or separate from each other.

<Constituent Features of the Rubbing Mechanism and the Shutter Mechanism>

Figure 10:
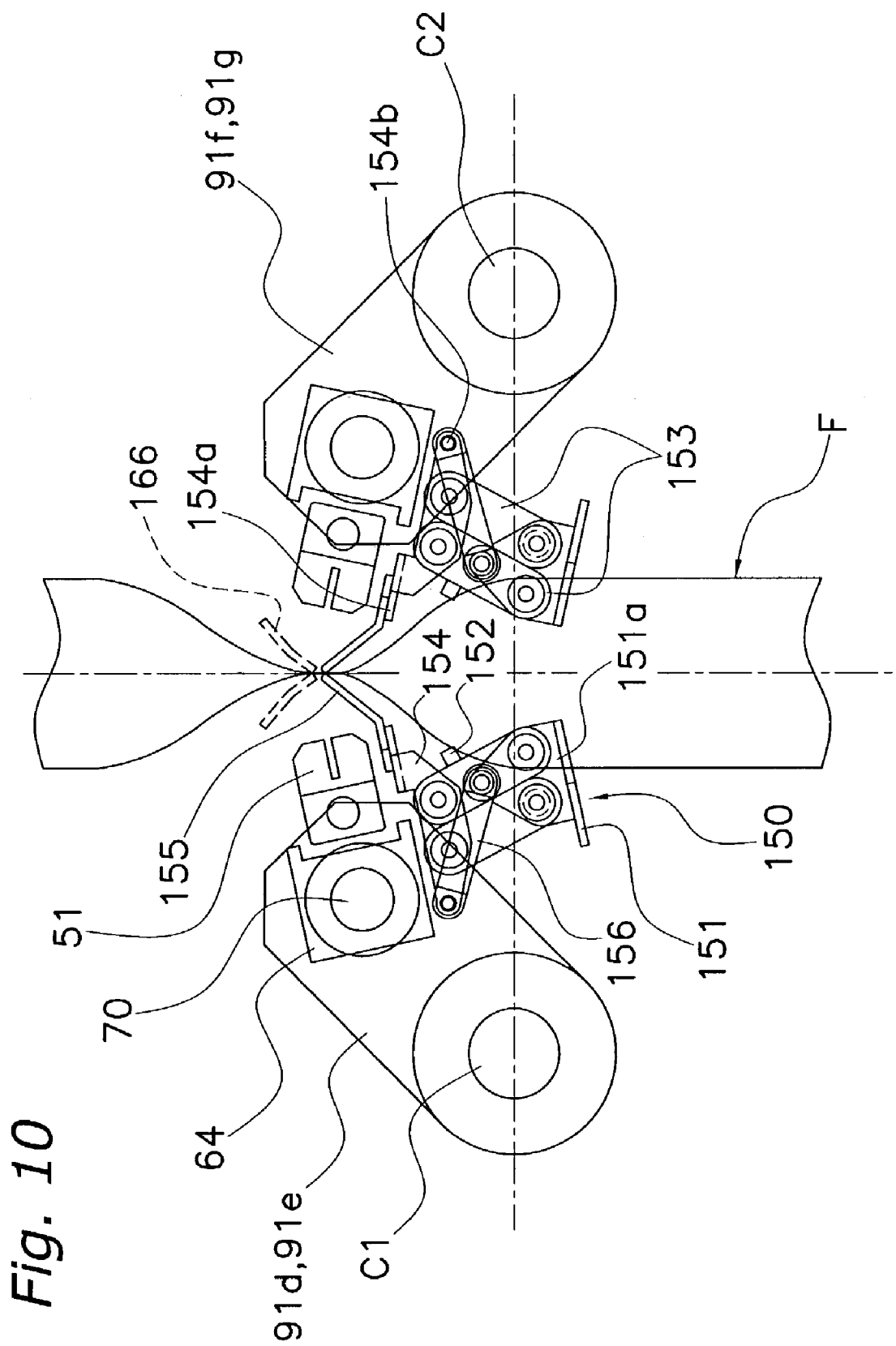
FIG. 10 is a diagrammatic view of the rubbing mechanisms of the bag-manufacturing and packaging machine in accordance with the embodiment of the present invention.

Referring to FIG. 10, the transverse sealing mechanism 17 described above is provided with shutter contact members 166 and rubbing contact members 155 that operate in coordination with the sealing jaws 51, 52 and serve to prevent items to be packaged from dropping into the tubular film F, as well as to push the items to be packaged downward during the transverse sealing operation. The rubbing mechanism 150 that coordinates the rubbing contact members 155 with the sealing jaws 51, 52 and the shutter mechanism 160 that coordinates the shutter contact members 166 with the sealing jaws 51, 52 will be discussed below.

FIGS. 10 and 13 to 17 illustrate the members using overlapping solid lines to make the movements of the members easy to understand. The arrangement of the rubbing mechanisms 150 and the shutter contact members 166 with respect to the sealing jaws 51 is the same as the arrangement of the rubbing mechanisms 150 and the shutter contact members 166 with respect to the sealing jaws 52. Therefore, the rubbing mechanisms 150 and shutter contact members 166 are described below in terms of the sealing jaws 51. In FIGS. 1 to 9, the rubbing mechanisms 150 and shutter mechanisms 160 are omitted to facilitate ease of understanding.

<Constituent Features of the Rubbing Mechanism>

The rubbing mechanisms 150 are provided as a left-right pair, each of the pair being supported on a base member 64 that supports the sealing jaws 51, 52 (see FIG. 10). The base member 64 is positioned between the levers 91d, 91e, 91f, 91g, 92d, 92e, 92f, 92g and the sealing members 51, 52.

Each rubbing mechanism 150 includes a fixed rubbing member 151, a stopper 152, parallel link members 153, a moving rubbing member 154, a rubbing contact member 155, and a spring member 156.

Each fixed rubbing member 151 is fixedly coupled to the base member 64 that supports the sealing jaw 51 such that the fixed rubbing member 151 cannot move relative to the base member 64. The fixed rubbing member 151 is provided with a protruding part 151a that is used for pin-supporting an end of each parallel link member 153 and an end of the spring member 156.

Figure 15:
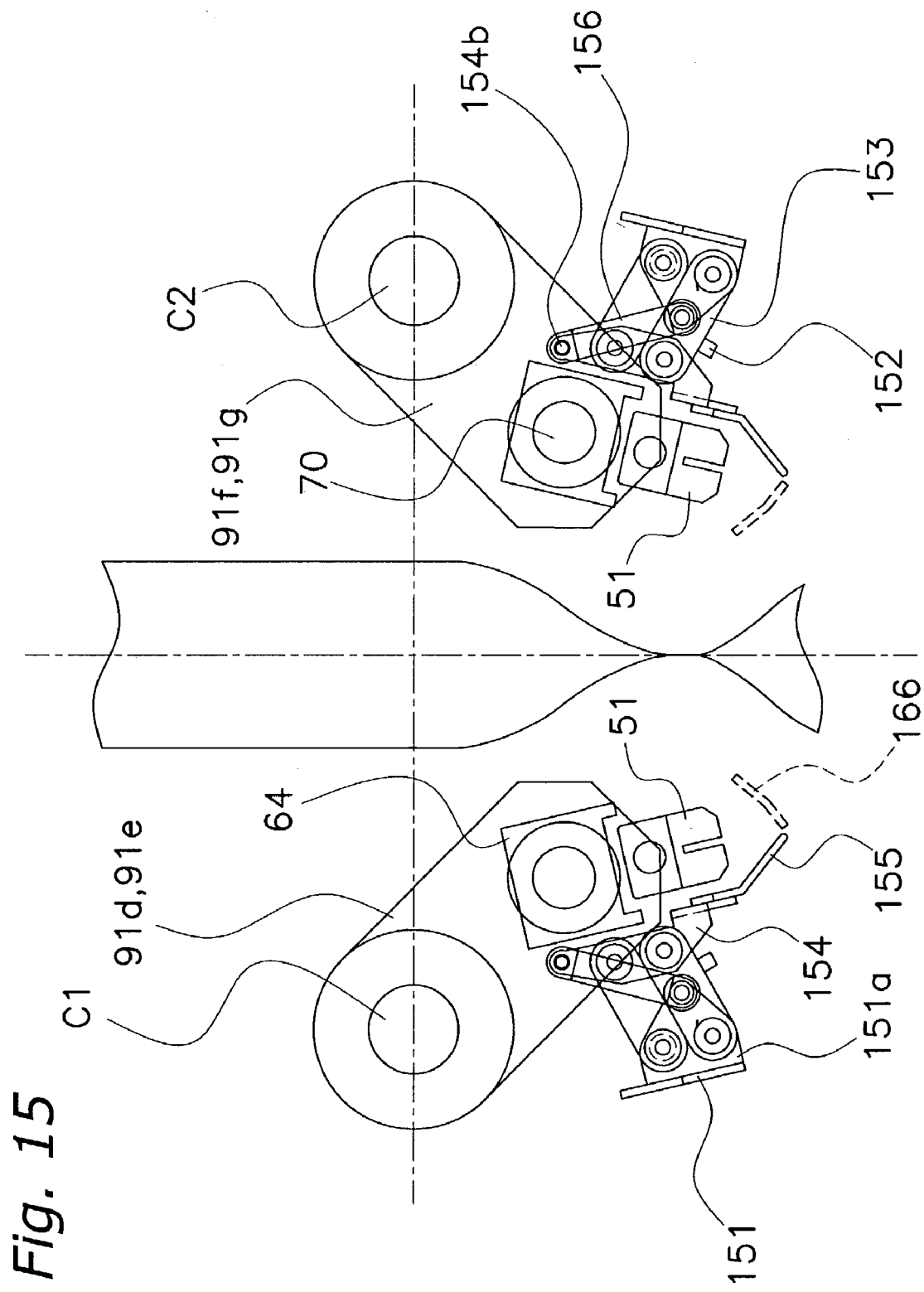
FIG. 15 is a diagrammatic view illustrating the movement of the rubbing mechanisms of the rubbing mechanisms of the bag-manufacturing and packaging machine in accordance with the embodiment of the present invention during the transverse sealing operation.

Each stopper 152 is also fixedly coupled to the base member 64 such that it cannot move relative thereto. As shown in FIG. 15, the stoppers 152 serve to stop the moving rubbing members 154 when the moving rubbing members 154 start to move away from the revolution axes C1, C2 due to the tensile force of spring members 156. As will be discussed later, the stoppers 152 cease to operate when the rubbing contact members 155 of the pair of rubbing mechanisms 150 are pressed together.

The parallel link members 153 are pairs of members that are offset from each other in the lengthwise direction of the sealing jaw 51. Each of the parallel link 153 is pin-supported at one end by the protruding part 151a of the rubbing fastening member 151 and at the other end by a pin support part 154b of the moving rubbing member 154. These parallel link members 153 enable the moving rubbing members 154 to move with respect to the fixed rubbing members 151 while generally maintaining their postures (see FIG. 10, FIG. 14, and FIG. 15).

Each moving rubbing member 154 has a middle part 154a and plate parts that are formed on both ends of the middle part 154a. The middle part 154a extends longer than the width of the tubular film F in a direction perpendicular to the plane of the paper of FIG. 10. The plate parts at both ends of the moving rubbing member 154 support the end parts of the parallel link members 153 with pins at the pin support parts 154b, as previously described. The plate parts of the moving rubbing members 154 also pin-support the ends of the spring members 156 at portions of the pin support parts 154b that are close to the revolution axes C1 and C2, respectively.

Figure 14:
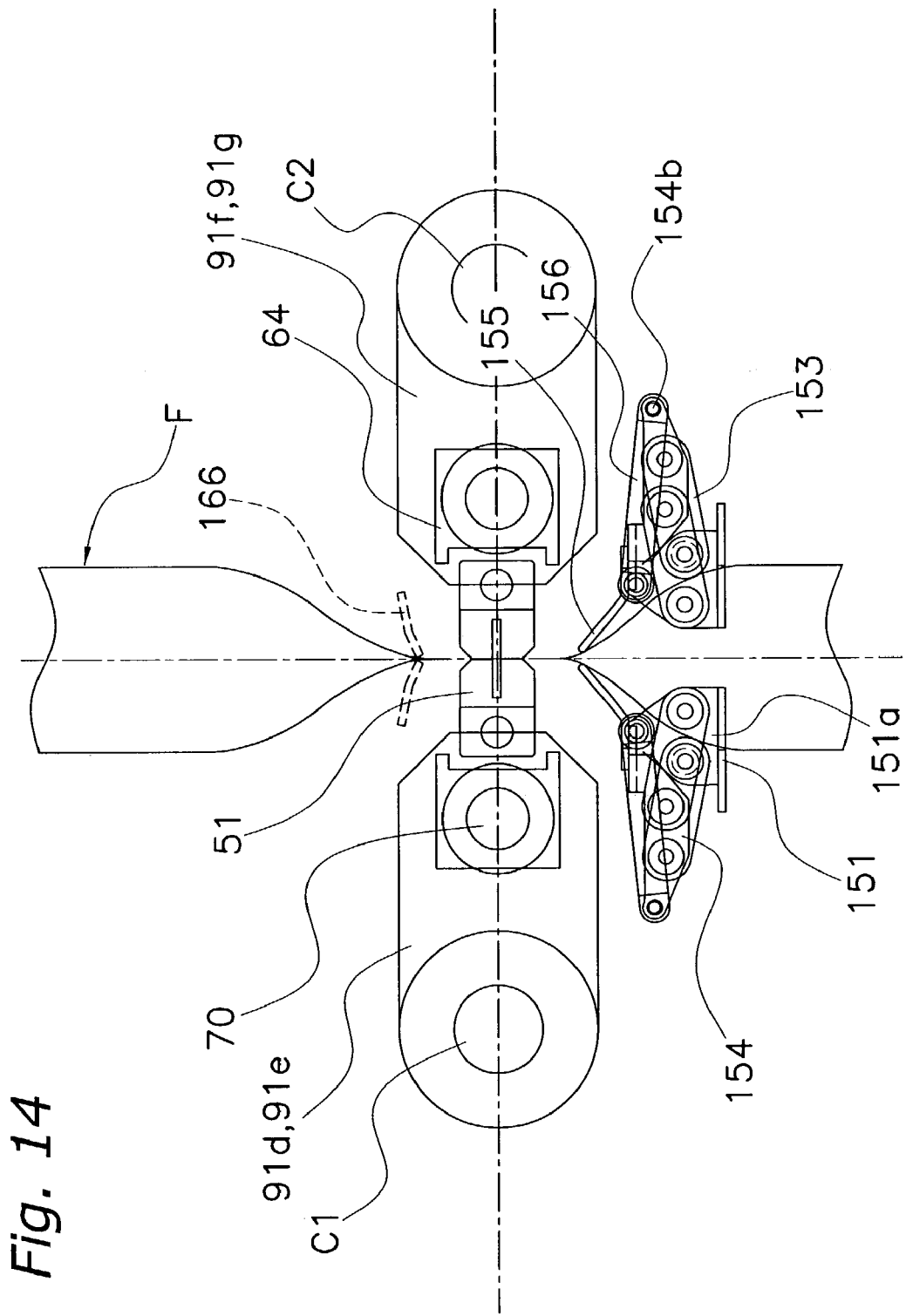
FIG. 14 is a diagrammatic view illustrating the movement of the rubbing mechanisms of the bag-manufacturing and packaging machine in accordance with the embodiment of the present invention during the transverse sealing operation.

The rubbing contact members 155, like the sealing jaws 51, are longer than the width of the tubular film F and are fixed to the middle parts 154a of the rubbing moving members 154. As shown in FIG. 10, the rubbing contact members 155 (along with the shutter contact members 166 discussed later) pinch the tubular film F earlier than do the sealing jaws 51, and rub the portion of the tubular film F that is to be sealed, as shown in FIG. 14.

Figure 11:
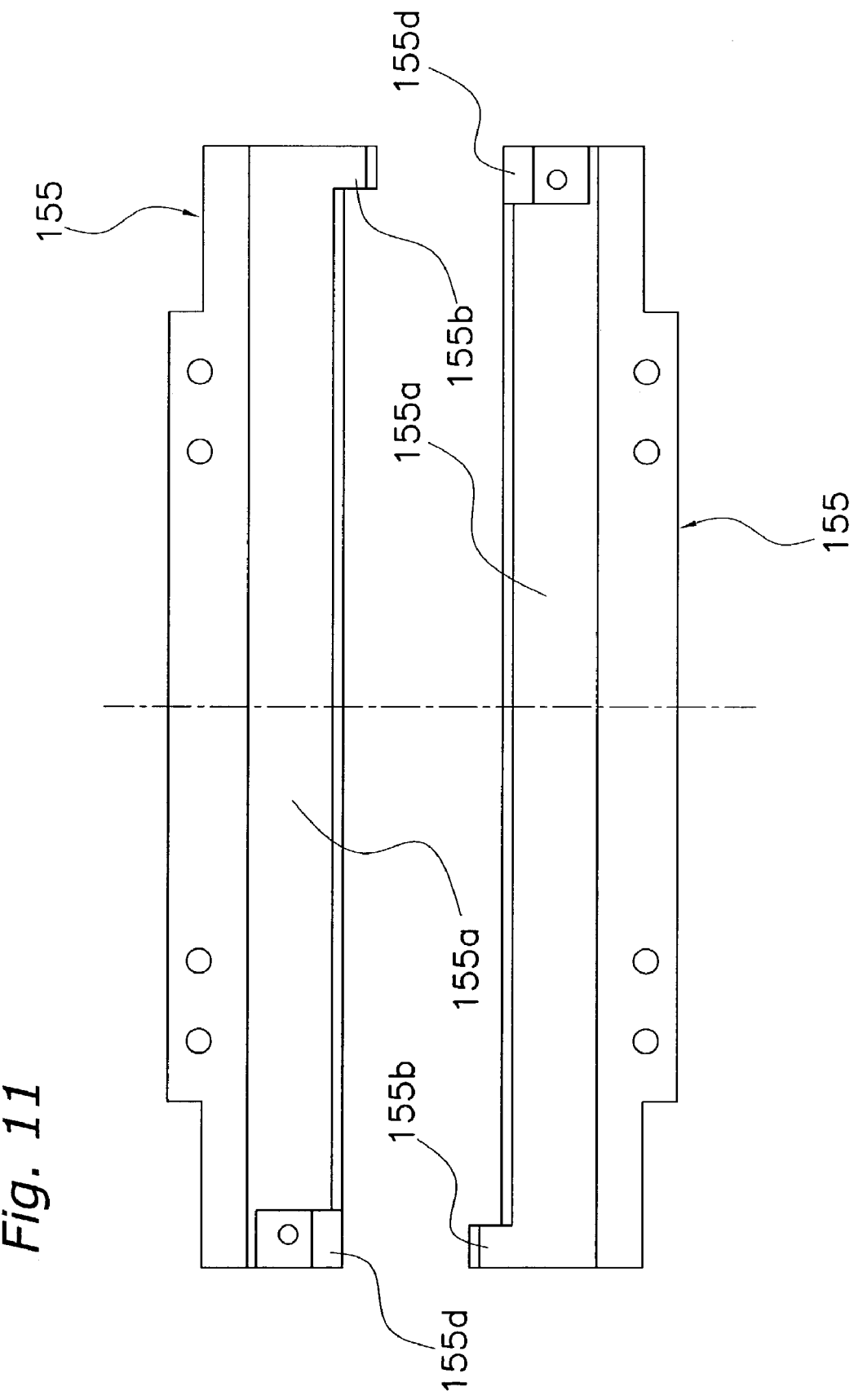
FIG. 11 is a top plan view of a pair of rubbing contact members of the bag-manufacturing and packaging machine in accordance with the embodiment of the present invention.
Figure 12:
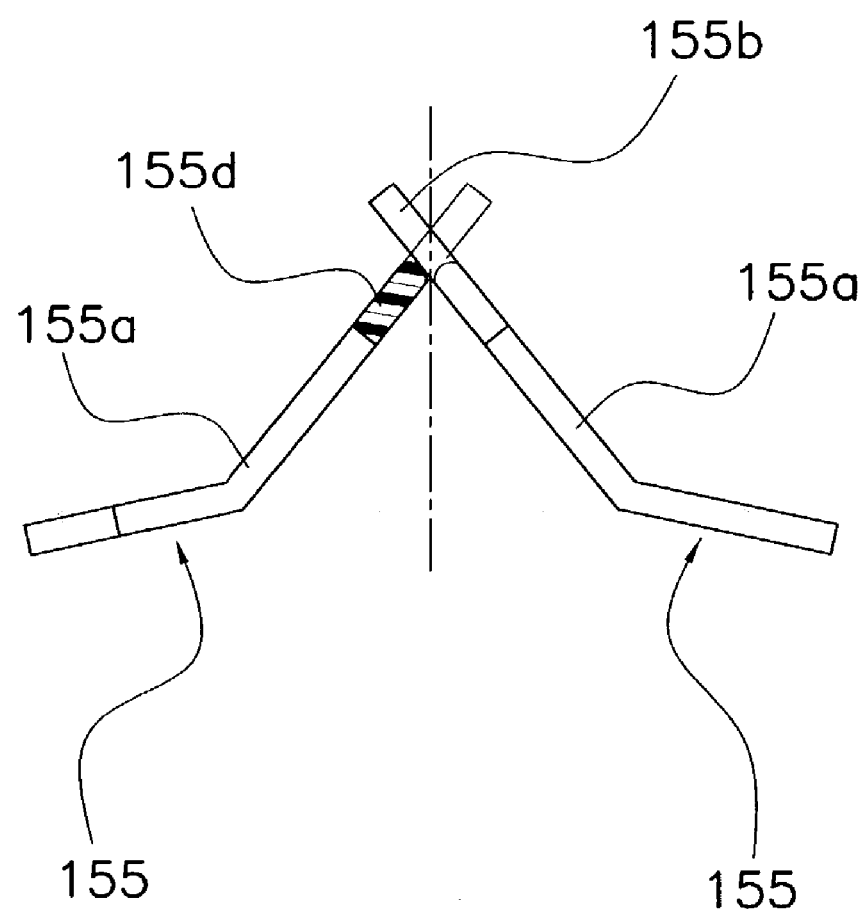
FIG. 12 illustrates the relationship between the edge parts of the pair of rubbing contact members when the rubbing mechanisms are in the state shown in FIG. 10.

FIG. 11 shows a plan view of a pair of rubbing contact members 155 before they reach the state shown in FIG. 10 (i.e., the state immediately preceding the rubbing operation). FIG. 12 shows in detail the relationship between the tips of the two rubbing contact members 155 when in the state shown in FIG. 10 (i.e., the state immediately preceding the rubbing operation). As shown in these figures, the two rubbing mechanisms 150 form a pair, and each of their rubbing contact members 155 has a main body part 155a that is made of metal and contacts the tubular film F, a protruding part 155b that is made of metal and protrudes outward from one end of the main body part 155a, and a resin part 155d. Each protruding part 155b is arranged so as to stop against the resin part 155d of the opposing rubbing contact member 155 (see FIG. 12) during the period from just before transverse sealing to just after the transverse sealing, i.e., when the mechanism is in the state shown in FIGS. 10 and 14.

The spring members 156 are pin-supported at one end by the protruding part 151a of the rubbing fastening member 151 and at the other end by a portion of the pin support part 154b of the rubbing moving member 154 that is close to the revolution axes C1, C2. As shown in FIG. 14, during transverse sealing the forces of the spring members 156 press the moving rubbing members 154 and rubbing contact members 155 toward the opposite rubbing mechanisms 150, respectively. As a result, the two rubbing contact members 155 enter into a relationship in which the respective protruding parts 155b and resin parts 155d at both ends thereof press against each other and a prescribed gap is formed between the two main body parts 155a.

Except for the rubbing moving member 154 and the rubbing contact member 155, all other members of the rubbing mechanism are provided on both ends of the rubbing contact member 155.

<Constituent Features of the Shutter Mechanism>

Figure 13:
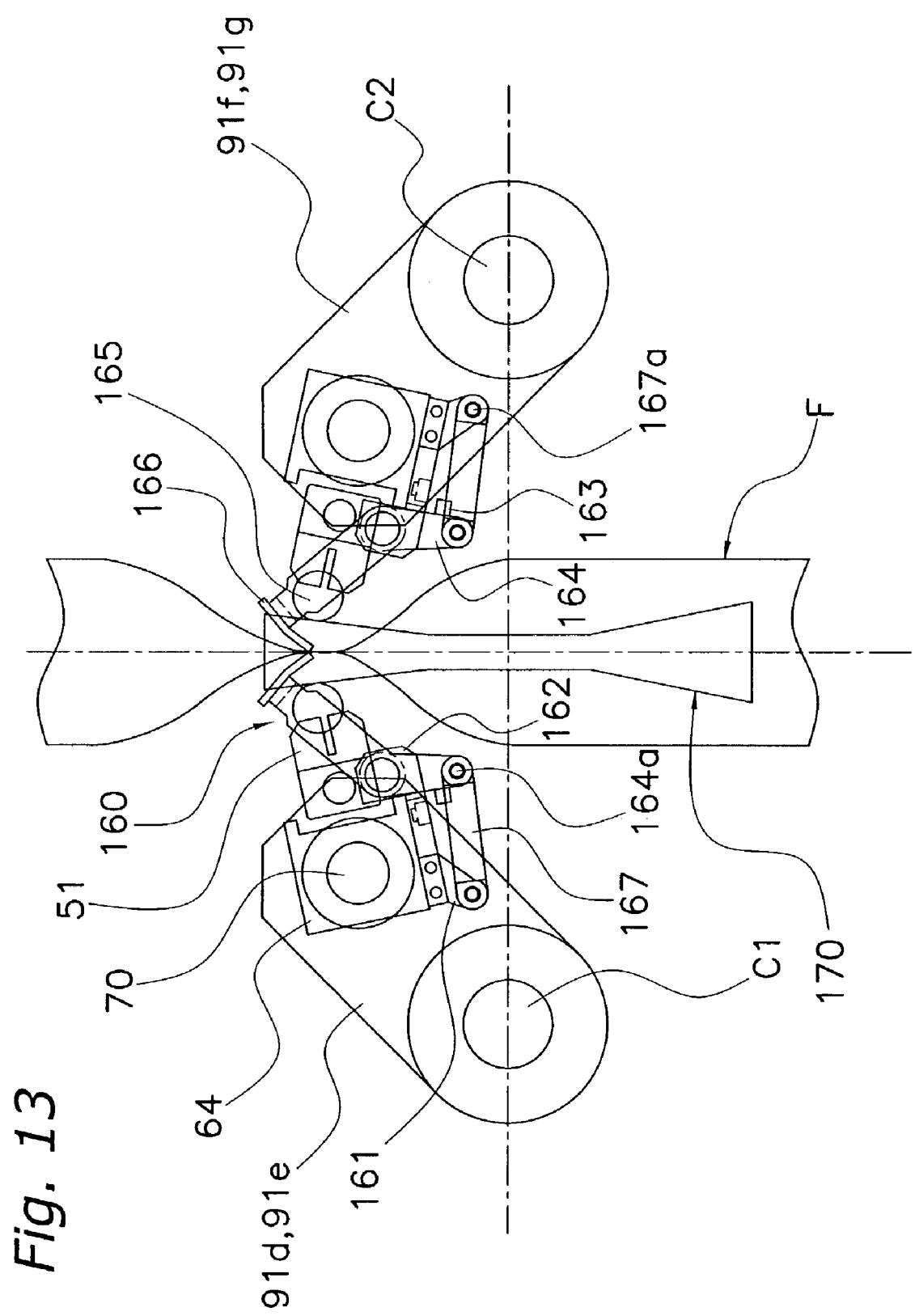
FIG. 13 is a diagrammatic view of the shutter mechanisms of the bag-manufacturing and packaging machine in accordance with the embodiment of the present invention.

The shutter mechanisms 160 are provided as a left-right pair, with each of the pair being supported on the base member 64 (see FIG. 13). Each shutter mechanism 160 includes fixed shutter members 161, 162, a stopper 163, a V-shaped member 164, a shutter bearing 165, a shutter contact member 166, and a spring member 167. The bag-manufacturing and packaging machine of the present embodiment also has a shutter cam 170 that guides the shutter bearings 165 during the period from just before transverse sealing to just after transverse sealing. The shutter cam 170 is shaped so as to have outer faces that include slanted surfaces as shown in FIG. 13. This serves to prevent the size of the gap between the two shutter contact members 166 from changing even when the postures of the shutter contact members 166 vary during a series of transverse sealing operations.

The fixed shutter members 161, 162 are fixedly coupled to the base member 64 that supports the sealing jaw 51 such that the fixed shutter members 161, 162 cannot move relative to the base member 64. The fixed shutter member 161 pin-supports one end of the spring member 167. The fixed shutter member 162 pin-supports a middle part of the V-shaped member 164.

Figure 17:
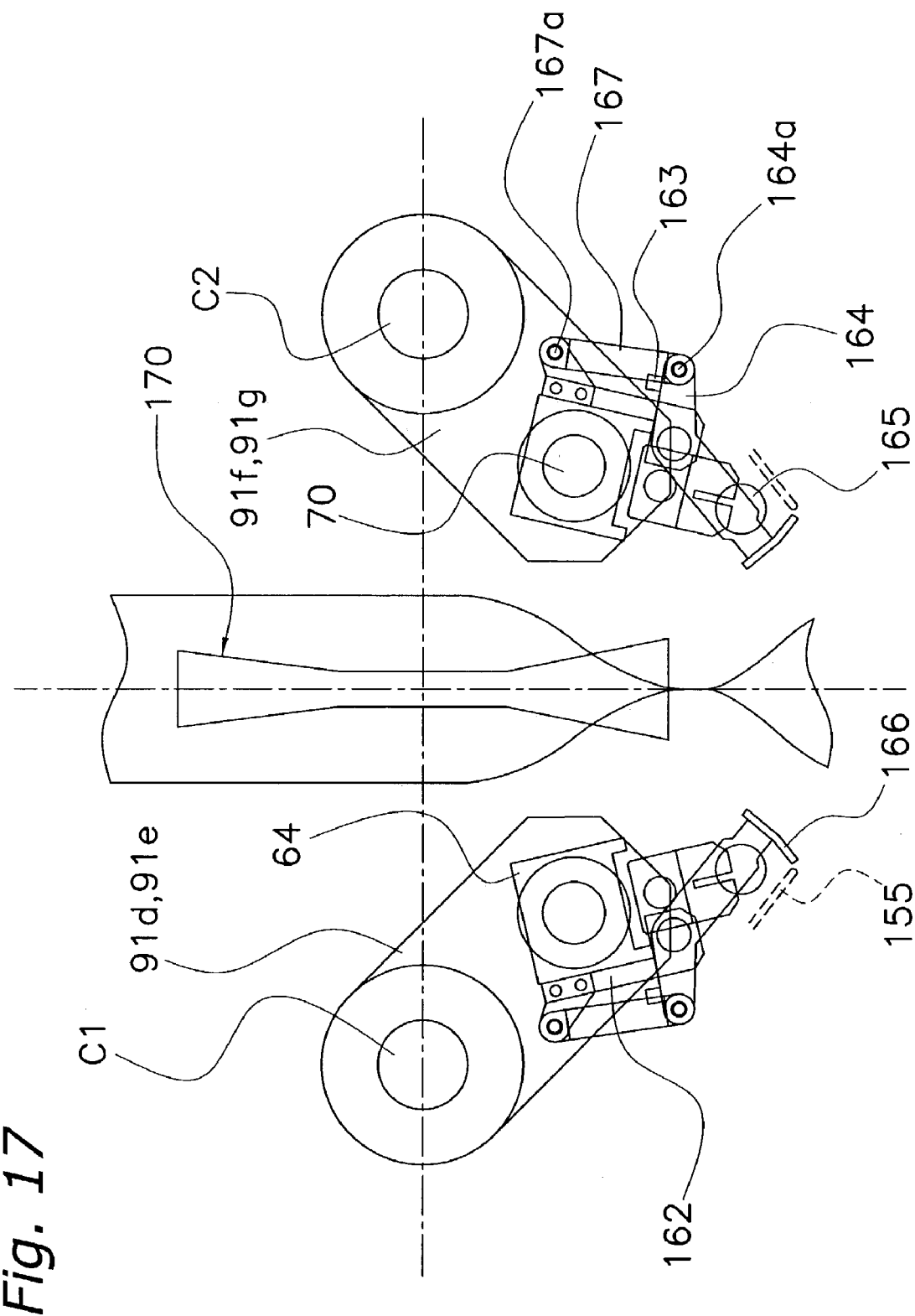
FIG. 17 is a diagrammatic view illustrating the movement of the shutter mechanisms of the rubbing mechanisms of the bag-manufacturing and packaging machine in accordance with the embodiment of the present invention during the transverse sealing operation.

Each stopper 163 is also fastened to the base member 64 such that it cannot move relative thereto. As shown in FIG. 17, the stoppers 163 serve to stop the V-shaped members 164 when the V-shaped members 164 start to swing due to the tensile force of the spring members 167. The stoppers 163 cease to operate when the force from the shutter cam 170 acts on the shutter cam followers and the spring members 167 are stretched.

The V-shaped members 164 are pin-supported at middle parts thereof by the shutter fastening members 162, as previously described. The shutter contact members 166 are fixedly attached to the tips of the V-shaped members 164. The shutter bearings 165 are installed in the vicinity of the attachment portions of the shutter contact members 166 in such a manner that the shutter bearings 165 can rotate freely. During the period from just before transverse sealing until just after transverse sealing, the shutter bearings 165 rotate along the outer surface of the shutter cam 170 as shown in FIG. 13. As a result, a substantially constant distance is maintained between the pair of shutter contact members 166 during the period from just before the transverse sealing until just after the transverse sealing (see FIGS. 13 and 16). An end part 164a of the V-shaped member 164 that is not fixed to the shutter contact member 166 supports an end of the spring member 167 with a pin.

The shutter contact members 166, similar to the sealing jaws 51, are longer than the width of the tubular film F. Both ends of the shutter contact members 166 are fixedly attached to the tips of V-shaped members 164. Along with the previously described rubbing contact members 155, the shutter contact members 166 pinch the tubular film F the sealing jaws 51 do so. In this manner, the shutter contact members 166 prevent items to be packaged from falling from above the portion to be sealed when the tubular film F is being sealed (see FIG. 16).

Figure 16:
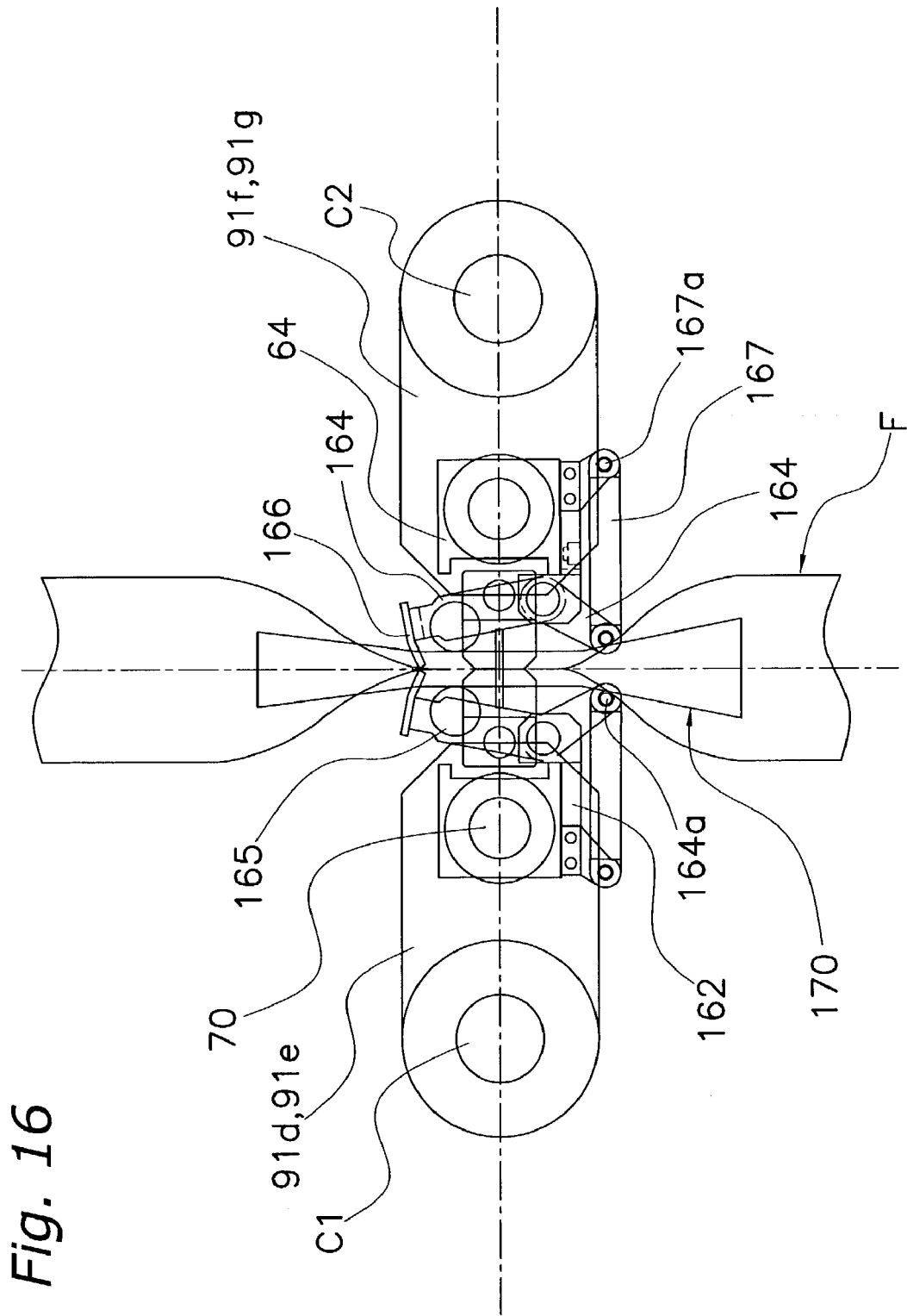
FIG. 16 is a diagrammatic view illustrating the movement of the shutter mechanisms of the rubbing mechanisms of the bag-manufacturing and packaging machine in accordance with the embodiment of the present invention during the transverse sealing operation.

One end of each spring member 167 is supported with a pin 167a on the shutter fastening member 161 and the other end is supported with a pin on the end part 164a of the V-shaped member 164. As shown in FIG. 16, during transverse sealing, the spring members 167 pull the end parts 164a of the V-shaped members 164 and thereby serve to press the shutter bearings 165 against the shutter cam 170.

<Operations of the Bag-Manufacturing and Packaging Machine Prior to the Transverse Sealing Operation>

Now the operation of the bag-manufacturing and packaging machine 1 will be described.

First, the operations executed prior to the transverse sealing operation are described using FIG. 2.

The sheet-like film F delivered to the forming mechanism 13 from the film feeding section 6 is wrapped onto the tube 31 from the former 32 and formed into a tubular shape. The pull-down belt mechanism 14 coveys the tubular film downward. While the film F is wrapped onto the tube 31, the two edges thereof overlap on the circumferential surface of the tube, and the overlapping portion is longitudinally sealed by the longitudinal sealing mechanism 15.

After the cylindrically-shaped tubular film F is sealed longitudinally, it leaves the tube 31 and moves down into the transverse sealing mechanism 17. Simultaneously with the movement of the tubular film F, the combination weighing machine 2 drops a mass of items to be packaged through the tube 31 and into the tubular film F. Then, the transverse sealing mechanism 17 thermally seals a transverse portion that corresponds to the top end of the bag containing the items to be packaged and the bottom end of the subsequent bag located there-above.

<The Transverse Sealing Operation, Including the Operations of the Rubbing Mechanism and the Shutter Mechanism>

Inside the transverse sealing mechanism 17, the revolution shafts 94, 95, 96, 97 are rotated by operating the drive motors 91, 92. The revolution shafts 94, 95 of the first sealing jaw moving unit 50a and the revolution shafts 96, 97 of the second sealing jaw moving unit 50b are moved horizontally by operating the servomotor 80. By controlling the motors 91, 92, 80 with a control unit 100, the sealing jaws 51, 52 are revolved through the D-shaped paths indicated by dotted lines in FIG. 6 and other figures. As shown in FIG. 14, the top end of the preceding bag and the bottom end of the subsequent bag are sealed substantially simultaneously and the preceding bag and the subsequent tubular film F are cut apart by a cutter mechanism (not shown) built into the sealing jaws 51.

The rubbing mechanisms 150 and the shutter mechanisms 160 are supported by the base member 64 and basically revolve about revolution axes C1, C2 together with the sealing jaws 51. However, since the rubbing contact members 155 of the rubbing mechanisms 150 and the shutter contact members 166 of the shutter mechanisms 160 are connected to the base member 64 through parallel link members 153 and V-shaped members 164, they move at different speeds than the sealing jaws 51 before and after transverse sealing.

FIG. 10 illustrates that, before transverse sealing is executed, the sealing jaws 51 are not contacting the tubular film F but the rubbing contact members 155 are contacting tubular film F. FIG. 13 illustrates that, before transverse sealing is executed, the sealing jaws 51 are not contacting the tubular film F but the shutter contact members 166 are contacting tubular film F. To facilitate understanding of the embodiment, the mechanisms 150 and 160 are shown separately in FIGS. 10 and 13, respectively. Meanwhile, FIGS. 14 and 16 illustrate the state of the mechanisms 150 and 160 when the sealing jaws 51 are contacting and thermally sealing the tubular film F. Finally, FIGS. 15 and 17 illustrate the state of the mechanisms 150, 160 immediately after they have separated from the tubular film F upon completion of the thermal seal.

During the transverse sealing operation, the sealing jaws 51 move sideways in coordination with the movement of the revolution axes C1, C2. Conversely, the gap between the pair of rubbing contact members 155 is maintained by the contact between the protruding parts 155b and resin parts 155d of the rubbing contact members 155. Similarly, the gap between the shutter contact members 166 of the shutter mechanisms 160 is maintained by the guidance of the shutter bearings 165 along the shutter cam 170. In short, during the transverse sealing operation, the gap between the two rubbing contact members 155 and the gap between the two shutter contact members 166 is kept substantially constant.

As a comparison of FIG. 10 and FIG. 14 demonstrates, during the initial state of the transverse sealing operation, the rubbing contact members 155 and the shutter contact members 166 touch against closely adjacent portions (above and below each other) of the tubular film (FIG. 10). Then, when the pair of sealing jaws 51 pinches the tubular film F and conducts thermal sealing (FIG. 14), the orientation of the rubbing contact members 155 and shutter contact members 166 changes such that they are at different vertical positions along the tubular film F. After contacting the tubular film F, the tips of the rubbing contact members 155 move downward faster than the sealing jaws 51 due to the change of posture of the parallel link members 153. Thus, the rubbing contact members 155 move downward relative to the sealing jaws 51 while changing their postures. This way, the rubbing contact members 155 downwardly transfer items to be packaged that exists in the portion of the tubular film F that is to be sealed. Meanwhile, after contacting the tubular film F, the tips of the shutter contact members 166 are moved downward by the swing motion of the V-shaped members 164. In other words, the shutter contact members 166 move upward relative to the sealing jaws 51 (downward from an absolute point of reference) while changing their postures. This way, the shutter contact members 166 prevent items be packaged from dropping into the portion of the tubular film F that is being sealed.

<Operations of the Bag-Manufacturing and Packaging Machine After the Transverse Sealing Operation>

Bags made in a continuous manner as described above are directed to a belt conveyor (not shown) by a slanted guide plate 19 shown in FIGS. 1 and 2 to be transferred to a weight checker or other downstream process. The slanted guide plate is a convention component. Thus, detailed structure of the slanted guide plate 19 will not be explained herein.

<Phase Difference Control of the Two Sealing Jaws 51 and 52>

Next, the phase difference control of the sealing jaws 51 and 52 achieved by controlling the drive motors 91 and 92 separately is discussed.

The drive motors 91 and 92 are operatively connected to a control unit in a conventional manner. The control unit preferably includes a microcomputer with a control program that controls the drive motors 91 and 92 as discussed below. The control unit can also include other conventional components such as an input interface circuit, an output interface circuit, and storage devices such as a ROM (Read Only Memory) device and a RAM (Random Access Memory) device. The memory circuit stores control programs such as ones for the sealing jaws 51 and 52. The control unit is capable of selectively controlling any of the drive motors 91 and 92 in accordance with the control program. It will be apparent to those skilled in the art from this disclosure that the precise structure and algorithms for the control unit can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

As previously described, the left and right sealing jaws 51 are revolved about revolution axes C1, C2 by the drive motor 91, and the left and right sealing jaws 52 are revolved about revolution axes C1, C2 by the drive motor 92. Thus, the phase difference (angle θ in FIG. 3) between the sealing jaw 51 and the sealing jaw 52 each side can be adjusted. In other words, by using a control unit to control the drive motors 91, 92 independently, the relative positions of the sealing jaws 51, 52 along the movement direction thereof can be adjusted. As a result, it becomes possible to accommodate various situations, several of which are described below.

Figure 7A:
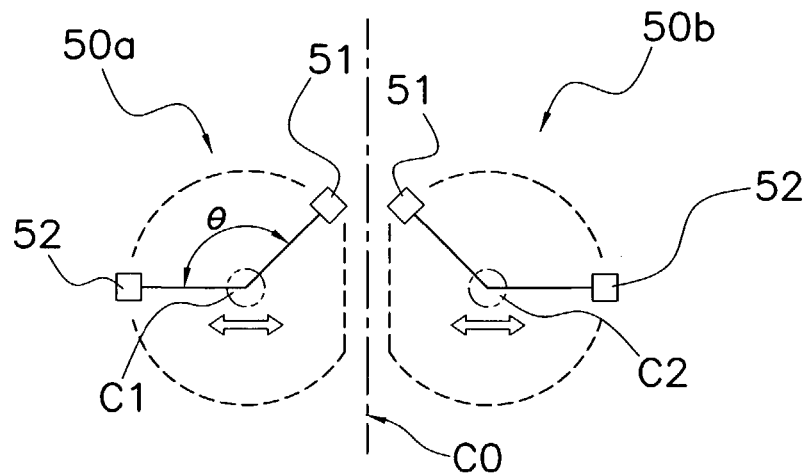
FIG. 7 shows an example of the movement of the sealing jaws of the bag-manufacturing and packaging machine in accordance with the embodiment of the present invention.
Figure 7B:
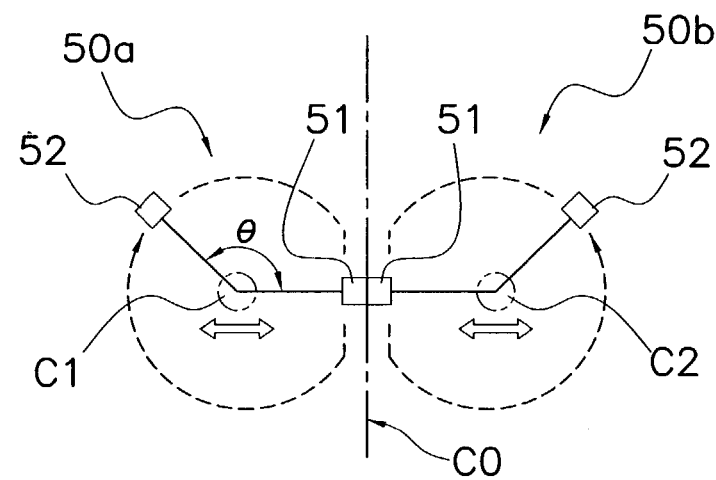
Figure 7C:
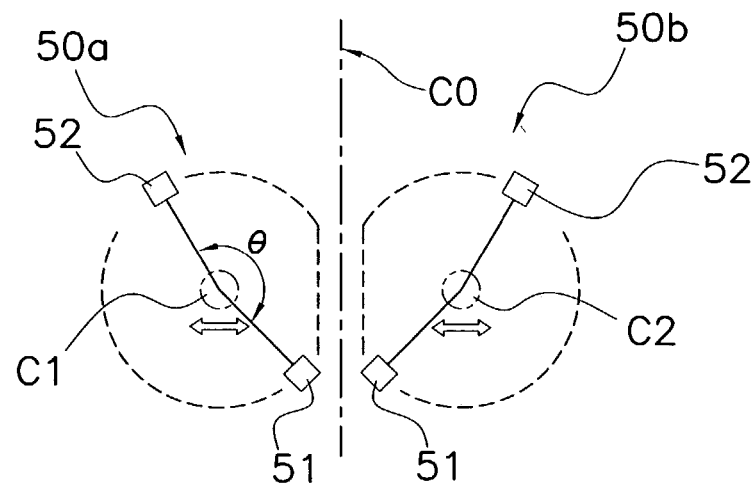
Figure 8A:
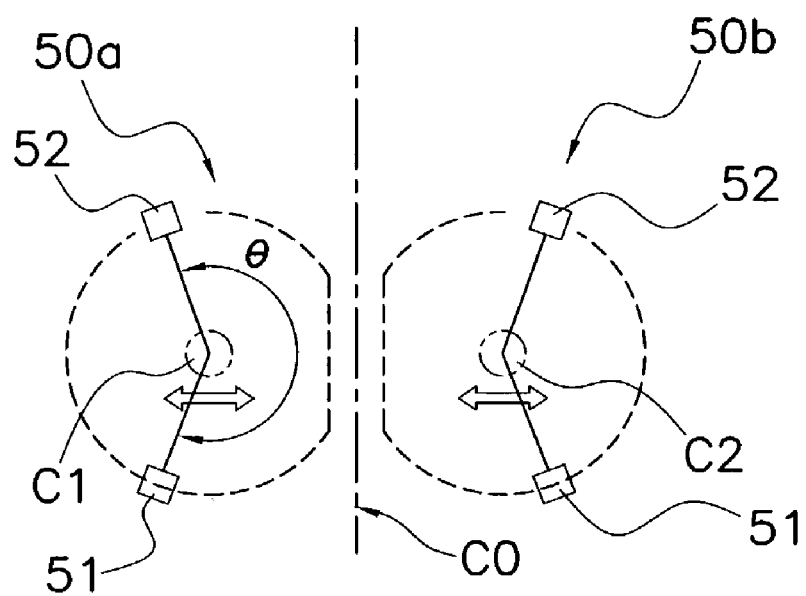
FIG. 8 shows an example of the movement of the sealing jaws of the bag-manufacturing and packaging machine in accordance with the embodiment of the present invention.
Figure 8B:
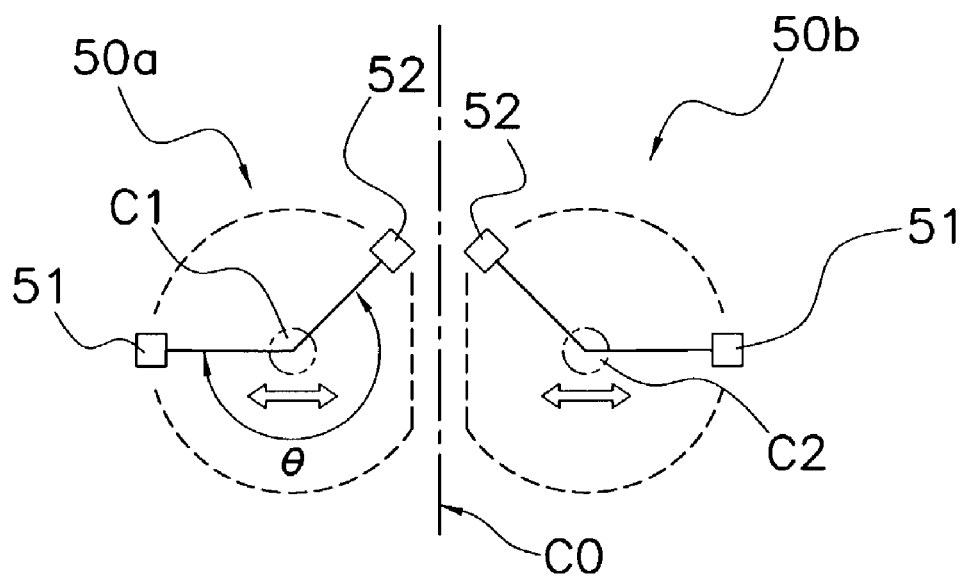

For example, in a situation shown in FIG. 4, where the width (diameter) of the tubular film F is comparatively large and the tubular film F is conveyed through the space close to the revolution axes C1 , C2 , it is preferred to keep the sealing jaws 51, 52 separated from the tubular film F as much as possible when transverse sealing is not being executed. Adjustment of the phase difference between the sealing jaws 51, 52 by a control unit designed to accommodate this preference will now be discussed while referring to FIGS. 7 and 8. FIG. 7(*a*) shows the state of the pair of sealing jaws 51 immediately before they execute transverse sealing. Here, the sealing jaws 51 are positioned ahead of the sealing jaws 52 by a phase difference (angle, an example of relative distance between sealing jaws 51 and 52) of less than 180 degrees. Then, when the sealing jaws 51 are executing transverse sealing as shown in FIG. 7(*b*), the sealing jaws 52 revolve more slowly than the sealing jaws 51 (or stop) so as not to interfere with the tubular film that is subsequently conveyed. As a result, the phase difference between the sealing jaws 51 and the sealing jaws 52 increases. The phase difference between the sealing jaws 51 and the sealing jaws 52 continues to increase through the state shown in FIG. 7(*c*) where the transverse sealing operation of the sealing jaws 51 has just ended. In the state shown in FIG. 8(*a*), neither pair of sealing jaws 51, 52 is executing transverse sealing. As shown in FIG. 8(*a*), during the period between the transverse sealing operation of the sealing jaws 51 and the transverse sealing operation of the sealing jaws 52, sealing jaws 51, 52 on both sides are positioned to the outside of the revolution axes C1 , C2. Also, when the sealing jaws 51, 52 shift from the state shown in FIG. 8(*a*) to the state shown in FIG. 8(*b*), i.e., before the sealing jaws 52 enter the state immediately before starting execution of transverse sealing, the sealing jaws 52 (which have been revolving more slowly than the sealing jaws 51) begin revolving faster than the sealing jaws 51.

As described above, the sealing jaws 51, 52 are positioned outside with respect to the revolution axes C1 , C2. Thus, when the width of the tubular film F, i.e., the width of the bag being made, is large, the tubular film F can be conveyed smoothly without having to move the revolution axes C1 , C2 sideways. This effect can only be achieved by securing spaces SP between the separated revolution shafts 94, 95, 96, 97.

Figure 9:
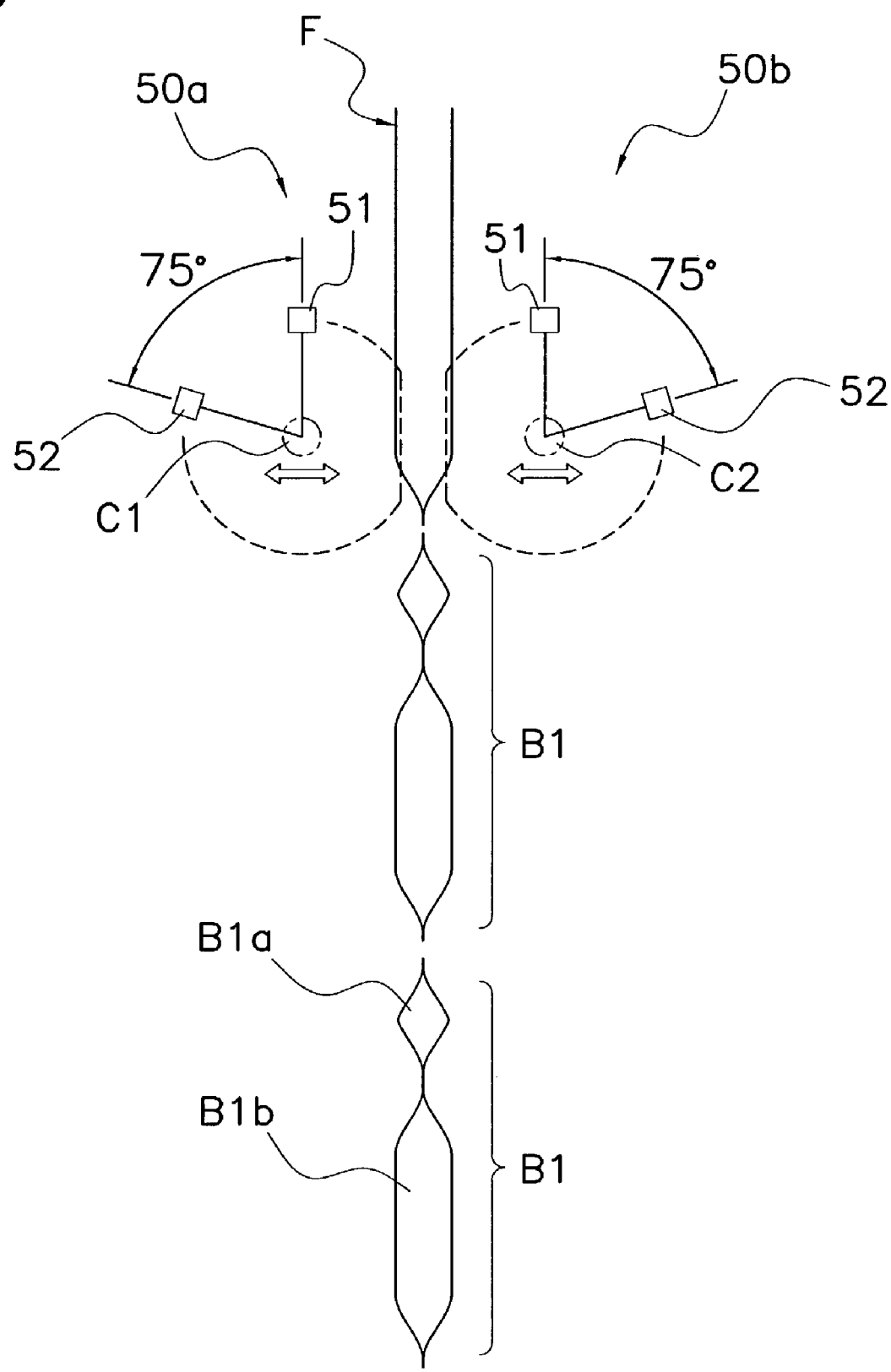
FIG. 9 shows an example of the movement of the sealing jaws of the bag-manufacturing and packaging machine in accordance with the embodiment of the present invention.

By adjusting the phase difference between the sealing jaws 51, 52, the spacing between consecutive transverse seals can be changed, as shown in FIG. 9. For example, equal spacing between transverse seals can be achieved by fixing the phase difference between the sealing jaws 51, 52 at 180 degrees. On the other hand, different spacings between transverse seals can be achieved by fixing the phase difference between the sealing jaws 51, 52 at an appropriate angle, as shown in FIG. 9. FIG. 9 shows an example of making bags B1 that are divided into a first bag B1*a* for containing a bonus item and a second bag B1*b* for containing the product. Thus, in this example, the sealing jaws 51 execute transverse sealing between the first bag B1*a* and the second bag B1*b* without operating the cutter, while the sealing jaws 52 execute transverse sealing between the current bag B1 and the subsequent bag B1 with operation of the cutter to cut the bags apart. In this example, the phase difference between the sealing jaws 51, 52 has been adjusted to 75 degrees, and both pairs of sealing jaws 51, 52 are revolved at the same speed such that the first bag B1*a* for containing a bonus item is approximately ¼ as long as the second bag B1*b* for containing the product.

Furthermore, even when bags are manufactured in a continuous manner, bags of different lengths can be intermixed there-among without stopping the bag-manufacturing and packaging machine 1, by feeding bag length data for the bags to be made to the control unit and by allowing the control unit to control the revolution speed of the sealing jaws 51, 52 based on the bag length data.

<Features of the Transverse Sealing Mechanism 17 of the Bag-Manufacturing and Packaging Mechanism 1 of this Embodiment>

(1)

The relative phase difference between the plurality of sets of sealing jaws 51, 52 (which move so as to revolve in an annular manner) changes when the control unit makes an adjustment. Thus, unlike conventional arrangements in which the phase differences between the plurality of sets of sealing jaws are fixed and not adjustable, in this embodiment the phase difference between the two sets of sealing jaws 51, 52 can be adjusted. Consequently, when a bag must be manufactured whose size is different from the bags manufactured hitherto, the different size can be accommodated by adjusting the phase difference between the sealing jaws 51, 52. Also, when it is necessary to execute the transverse sealing of the tubular film F at different spacings, the different spacings can be accommodated by adjusting the phase difference between the sealing jaws 51, 52.

(2)

With this embodiment, there are few cases in which the movement of one set of sealing jaws 51 during thermal sealing of the tubular film limits the movement of the other sealing jaws 52.

In order to prevent the sealing jaws from disturbing the conveyance of the tubular film, the sealing jaws need to be kept in a waiting position and separated from the tubular film as much as possible during the period from when the thermal sealing operation of one set of sealing jaws ends until when the thermal sealing operation of the other set of sealing jaws begins. With conventional transverse sealing mechanisms, the sealing jaws are positioned at equal intervals. Therefore, the flexibility to accommodate different situations is lacking.

Conversely, with this embodiment, the control unit controls the separate drive motors 91, 92 that move each set of sealing jaws on an individual basis. Thus, the width dimension of the tubular film can be accommodated flexibly and the movement of the sealing jaws 51, 52 can be controlled such that the sealing jaws 51, 52 do not disturb the conveyance of the tubular film F even when the width of the tubular film F is large.

<Alternative Embodiments>

(A)

The previously described embodiment was constructed such that the left-right pairs of sealing jaws 51, 52 are made to revolve using separate drive motors 91, 92, and the phase difference between the sealing jaws 51, 52 can be modified. However, it is also possible to provide three or more pairs of sealing jaws to achieve even higher speeds.

Figure 18:
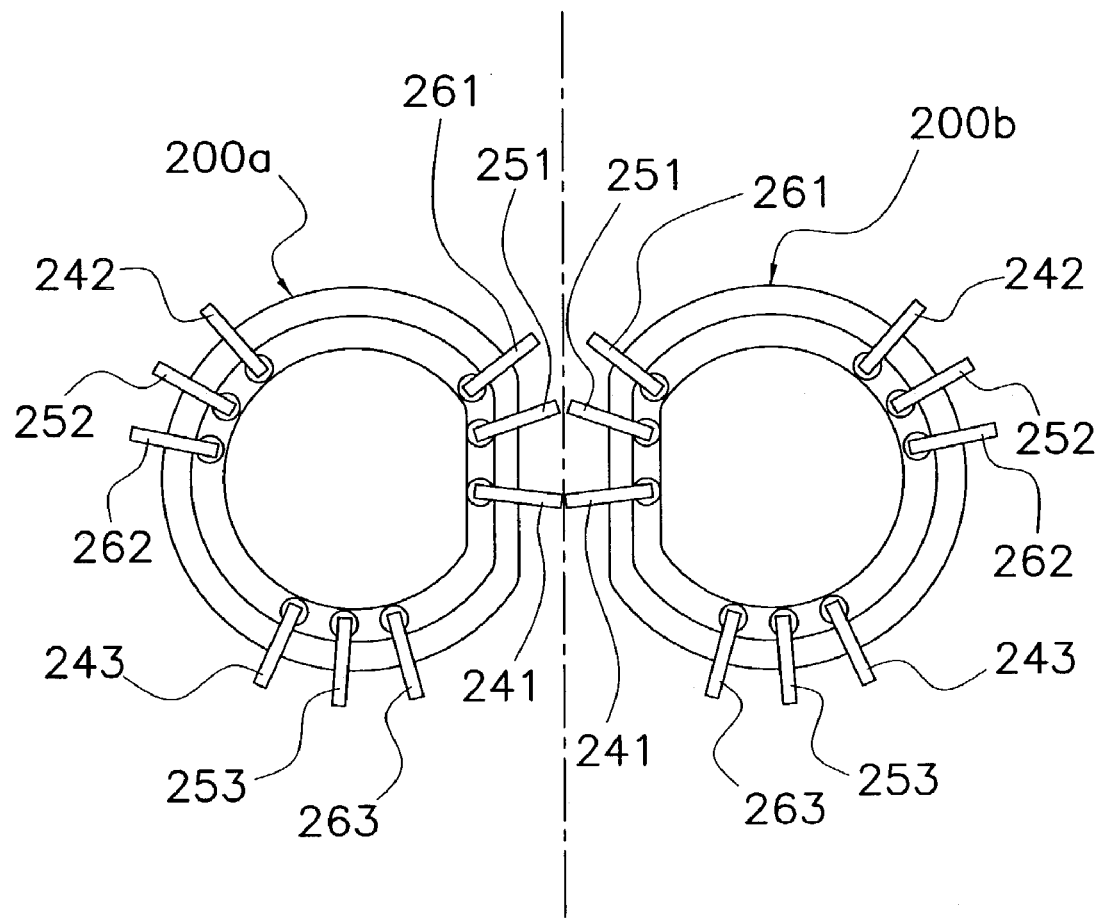
FIG. 18 is a diagrammatic view the transverse sealing mechanism in accordance with an alternative embodiment of the present invention.

For example, as shown in FIG. 18, a pair of revolution rails 200*a*, 200*b* can be provided with each being fitted with three sealing jaws 251, 252, 253, three rubbing members 241, 242, 243, and three shutter members 261, 262, 263. Thus configured, the sealing jaws and other members can feasibly be made to revolve around the revolution rails 200a, 200b with small built-in motors or with a linear motor arrangement.

In this embodiment, the revolution rails 200a and 200b are the circulating paths, on which the sealing jaws 251, 252, 253 circulate.

Figure 19:
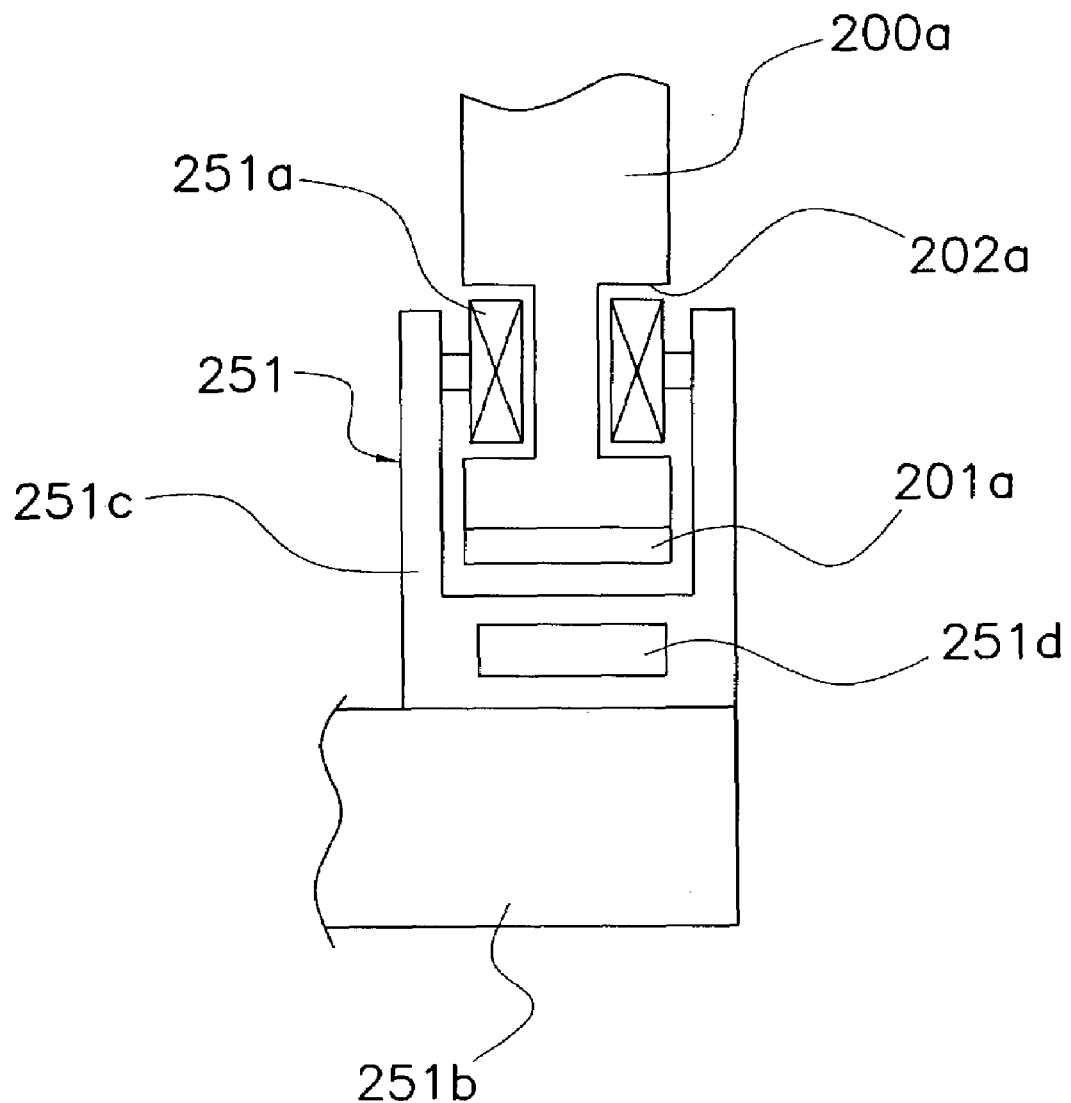
FIG. 19 is a cross sectional view of a sealing jaw in accordance with the alternative embodiment of the present invention.
Figure 20:
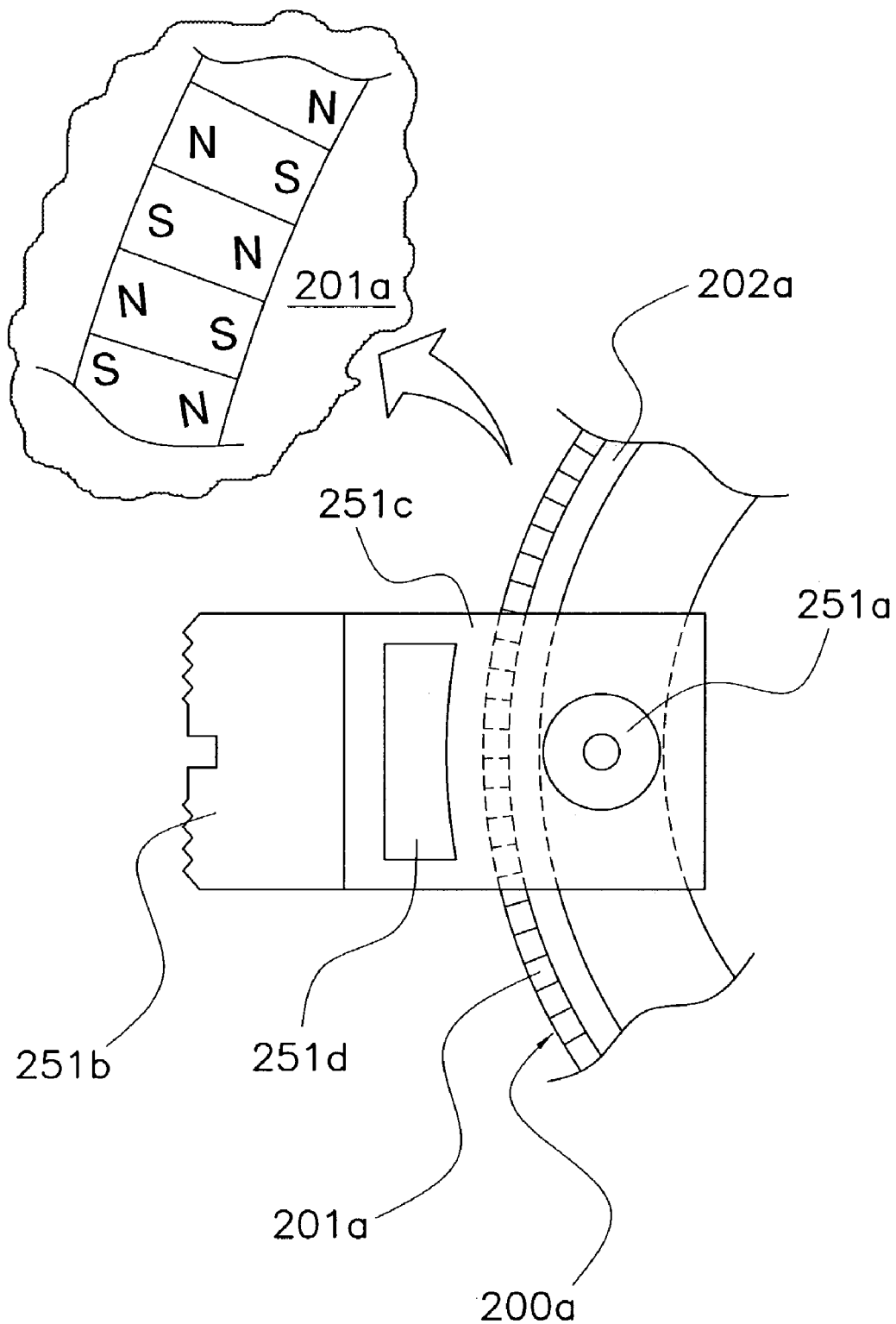
FIG. 20 is a cross sectional view of the sealing jaw in accordance with the alternative embodiment of the present invention.

Referring to FIGS. 19 and 20, a structure in which a linear motor arrangement is used to make the sealing jaws 251 and other members revolve will now be described using a sealing jaw 251 as an example. Each sealing jaw 251 has a main body 251b, levers 251c that extend inward with respect to the rail 200a from both ends of the main body 251b, rollers 251a that are turnably supported by inward portions of the levers 251c, and a coil 251d. The revolution rail 200a has grooves 202a for the rollers 251a to roll along and permanent magnets 201a that face the coil 251d. As shown in the enlarged view at the top left of FIG. 20, the permanent magnets 201a are arranged alternately such that the S and N poles of adjacent permanent magnets are oriented in the opposite direction. The sealing jaw 251 can be moved along the revolution rail 200 by changing the direction of the current passed through the coil 251d, and the speed at which the sealing jaw 251 revolves changes in response to the speed at which the direction of the current passing through the coil 251d is changed.

Using the structure just described, three sealing jaws 251, 252, 253, three rubbing members 241, 242, 243, and three shutter members 261, 262, 263 can be controlled separately. Not only can the phase differences between the sealing jaws 251, 252, 253 be adjusted, the phase differences between the sealing jaws 251, 252, 253 and the rubbing members 241, 242, 243 and the phase differences between the sealing jaws 251, 252, 253 and the shutter members 261, 262, 263 can also be adjusted. Thus, the movement of one sealing jaw during transverse sealing is less likely to limit the movement of the other sealing jaws, the rubbing members, or the shutter members.

(B)

In the previously described embodiment, the sealing jaws 51, 52 were revolved using separate drive motors 91, 92 so that the phase angle between the sealing jaws 51, 52 could be changed. However, it is also possible to link the sealing jaws 51, 52 with a mechanism that can adjust the relative distance between them and revolve the sealing jaws 51, 52 using a single drive motor.

In the present invention, the relative distance between the sealing parts of the transverse sealing mechanism, which move along an annular path, can be changed by adjustment by the adjusting part. As a result, the movement of one sealing part during thermal sealing of the packaging material is less likely to limit the movement of the other sealing parts. For example, in order to prevent the sealing parts from disturbing the conveyance of the tubular packaging material, the sealing parts need to be kept in a waiting position and separated from the tubular packaging material as much as possible during the period from when the thermal sealing operation of the first sealing part ends until when the thermal sealing operation of the second sealing part begins. With conventional transverse sealing mechanisms, the sealing parts are positioned at equal intervals and the flexibility to accommodate different situations is lacking. Conversely, with the transverse sealing mechanism of the present invention, the relative distance changing means can change the relative positions of the sealing parts along the annular path. Thus, the transverse width dimension of the tubular packaging material can be accommodated flexibly, and the relative positions of the sealing parts can be controlled such that the sealing parts do not disturb the conveyance of the tubular packaging material even when the transverse width of the tubular packaging material is large.

As used herein, the following directional terms "forward," "rearward," "above," "downward," "vertical," "horizontal," "below" and "transverse" as well as any other similar directional terms refer to those directions of a device equipped with the present invention. Accordingly, these terms, as utilized to describe the present invention should be interpreted relative to a device equipped with the present invention.

The terms of degree such as "substantially," "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2002-142892. The entire disclosure of Japanese Patent Application No. 2002-142892 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A transverse sealing mechanism that thermally seals a packaging material in a transverse direction, which is perpendicular to a direction in which the packaging material is conveyed, in a bag-manufacturing and packaging machine that makes bags by sealing a tubular packaging material longitudinally and transversely while also filling the bags with items to be packaged, said transverse sealing mechanism comprising:
a plurality of sealing parts that are arranged to circulate on a same circulating path to thermally seal the tubular packaging material by making contact with the tubular packaging material, the circulating path being alongside a direction in which the tubular packaging material is to be conveyed;
adjusting means operatively connected to said plurality of sealing parts for adjusting a relative distance between adjacent ones of said sealing parts and a relative angle between adjacent ones of said sealing parts to any desired angle greater than 0° and smaller than 360°; and
a plurality of drive means operatively connected to each of said sealing parts, each drive means separately driving each sealing part;
said adjusting means adjusting the relative distance between said plurality of sealing parts by controlling said plurality of drive means.

2. A transverse sealing mechanism for a bag-manufacturing and packaging machine as set forth in claim 1, wherein said adjusting means adjusts the relative distance between said sealing parts according to the size of the bag being made.

3. A transverse sealing mechanism for a bag-manufacturing and packaging machine as set forth in claim 1, further comprising
a first rotational axis around which said plurality of sealing parts rotate.

4. A transverse sealing mechanism for a bag-manufacturing and packaging machine as set forth in claim 3, wherein
said first rotational axis includes first and second revolutionary shafts, which are separate from one another, and first and second revolutionary parts, and
said plurality of sealing parts are arranged to rotate about said first rotational axis via said first and second revolutionary parts, said first revolutionary part rotatively coupling one end of one of said sealing parts to said first revolutionary shaft, said second revolutionary part rotatively coupling one end of another of said sealing parts to said second revolutionary shaft.

5. A transverse sealing mechanism for a bag-manufacturing and packaging machine as set forth in claim 1, further comprising
rubbing means for moving the items to be packaged downward by operating in coordination with said sealing parts so as to contact the tubular packaging material before said sealing parts do.

6. A transverse sealing mechanism for a bag-manufacturing and packaging machine as set forth in claim 1, further comprising
shutter means for restricting intrusion of the items to be packaged into a portion of the tubular packaging that is being sealed during transverse sealing, by operating in coordination with said sealing parts so as to contact the tubular packaging material before said sealing parts do.

7. A transverse sealing mechanism for a bag-manufacturing and packaging machine as set forth in claim 5, further comprising
a first rotational axis around which said plurality of sealing parts rotate,
said rubbing means including a rubbing member that is arranged to rotate about said first rotational axis, and
said adjusting means adjusting a relative distance between said rubbing member and said plurality of sealing parts.

8. A transverse sealing mechanism for a bag-manufacturing and packaging machine as set forth in claim 6, further comprising
a first rotational axis around which said plurality of sealing parts rotate,
said shutter means including a shutter part that is arranged to rotate about said first rotational axis, and
said adjusting means adjusting a relative distance between said shutter part and said plurality of sealing parts.

9. A transverse sealing mechanism that thermally seals a packaging material in a transverse direction, which is perpendicular to a direction in which the packaging material is conveyed, in a bag-manufacturing and packaging machine that makes bags by sealing a tubular packaging material longitudinally and transversely while also filling the bags with items to be packaged, said transverse sealing mechanism comprising:
a plurality of sealing parts that are arranged to circulate on a same circulating path to thermally seal the tubular packaging material by making contact with the tubular packaging material, the circulating path being alongside a direction in which the tubular packaging material is to be conveyed;
a control unit operatively connected to said plurality of sealing parts and configured to adjust a relative distance between adjacent ones of said sealing parts and a relative angle between adjacent ones of said sealing parts to any desired angle greater than 0° and smaller than 360°; and
a plurality of motors operatively connected to each of said sealing parts, each motor separately driving each sealing part;
said control unit adjusting the relative distance between said plurality of sealing parts by controlling said plurality of motors.

10. A transverse sealing mechanism for a bag-manufacturing and packaging machine as set forth in claim 9, wherein
said control unit is configured to adjust the relative distance between said sealing parts according to the size of the bag being made.

11. A transverse sealing mechanism for a bag-manufacturing and packaging machine as set forth in claim 9, further comprising
a first rotational axis around which said plurality of sealing parts rotate.

12. A transverse sealing mechanism for a bag-manufacturing and packaging machine as set forth in claim 11, wherein
said first rotational axis includes first and second revolutionary shafts, which are separate from one another, and first and second revolutionary parts, and
said plurality of sealing parts are arranged to rotate about said first rotational axis via said first and second revolutionary parts, said first revolutionary part rotatively coupling an end of one of said sealing parts to said first revolutionary shaft, said second revolutionary part rotatively coupling an end of another of said sealing parts to said second revolutionary shaft.

13. A transverse sealing mechanism for a bag-manufacturing and packaging machine as set forth in claim 9, further comprising
a rubbing member operatively coupled to said control unit to move the items to be packaged downward by operating in coordination with said sealing parts so as to contact the tubular packaging material before said sealing parts do.

14. A transverse sealing mechanism for a bag-manufacturing and packaging machine as set forth in claim 9, further comprising
a shutter mechanism operatively coupled to said control unit to restrict intrusion of the items to be packaged into a portion of the tubular packaging that is being sealed during transverse sealing, by operating in coordination with said sealing parts so as to contact the tubular packaging material before said sealing parts do.

15. A transverse sealing mechanism for a bag-manufacturing and packaging machine as set forth in claim 13, further comprising
a first rotational axis around which said plurality of sealing parts rotate,
said rubbing member being arranged to rotate about said first rotational axis, and
said control unit being configured to adjust a relative distance between said rubbing member and said plurality of sealing parts.

16. A transverse sealing mechanism for a bag-manufacturing and packaging machine as set forth in claim 14, further comprising
a first rotational axis around which said plurality of sealing parts rotate,
said shutter mechanism including a shutter part that is arranged to rotate about said first rotational axis, and
said control unit being configured to adjust a relative distance between said shutter part and said plurality of sealing parts.

* * * * *